United States Patent [19]
Tsuyama et al.

[11] Patent Number: 5,117,934
[45] Date of Patent: Jun. 2, 1992

[54] SLIP CONTROL SYSTEM FOR VEHICLE AND ROUGH ROAD DETECTING SYSTEM

[75] Inventors: Toshiaki Tsuyama; Kazutoshi Nobumoto; Kaoru Sotoyama; Toru Onaka; Fumio Kageyama; Haruki Okazaki; Makoto Kawamura, all of Hiroshima, Japan

[73] Assignee: Mazda Motor Corporation, Hiroshima, Japan

[21] Appl. No.: 673,460

[22] Filed: Mar. 22, 1991

[30] Foreign Application Priority Data

| Mar. 22, 1990 | [JP] | Japan | 2-72642 |
| Mar. 28, 1990 | [JP] | Japan | 2-80275 |
| Mar. 30, 1990 | [JP] | Japan | 2-83608 |
| Mar. 30, 1990 | [JP] | Japan | 2-83609 |

[51] Int. Cl.$^5$ ............................................. B60K 28/16
[52] U.S. Cl. ................................. 180/197; 364/426.02; 364/426.03
[58] Field of Search ................... 180/197; 364/426.02, 364/426.01, 426.03

[56] References Cited

U.S. PATENT DOCUMENTS

| 4,794,538 | 12/1988 | Cao et al. | 364/426.03 X |
| 4,797,825 | 1/1989 | Shimanuki et al. | 364/426.02 |
| 4,823,269 | 4/1989 | Fujioka et al. | 180/197 X |
| 4,841,446 | 6/1989 | Leiber et al. | 364/426.02 |
| 4,924,396 | 5/1990 | Fujioka et al. | 180/197 X |
| 4,947,332 | 8/1990 | Ghoneim | 180/197 X |
| 4,985,838 | 1/1991 | Hashiguchi et al. | 364/426.02 |
| 4,991,103 | 2/1991 | Lin | 180/197 X |
| 5,009,279 | 4/1991 | Matsuda | 180/197 |

Primary Examiner—Charles A. Marmor
Assistant Examiner—Kevin Hurley
Attorney, Agent, or Firm—Sixbey, Friedman, Leedom & Ferguson

[57] ABSTRACT

In a slip control system for a vehicle a slip ratio of driving wheels of the vehicle is detected, and the slip of the driving wheels is controlled to converge on a predetermined target slip ratio when the slip ratio of the driving wheels exceeds a predetermined threshold slip ratio. When the vehicle is running a rough road, the threshold slip ratio is increased. The running condition of the vehicle is detected and increase of the threshold slip ratio is inhibited depending on the running condition of the vehicle.

22 Claims, 14 Drawing Sheets

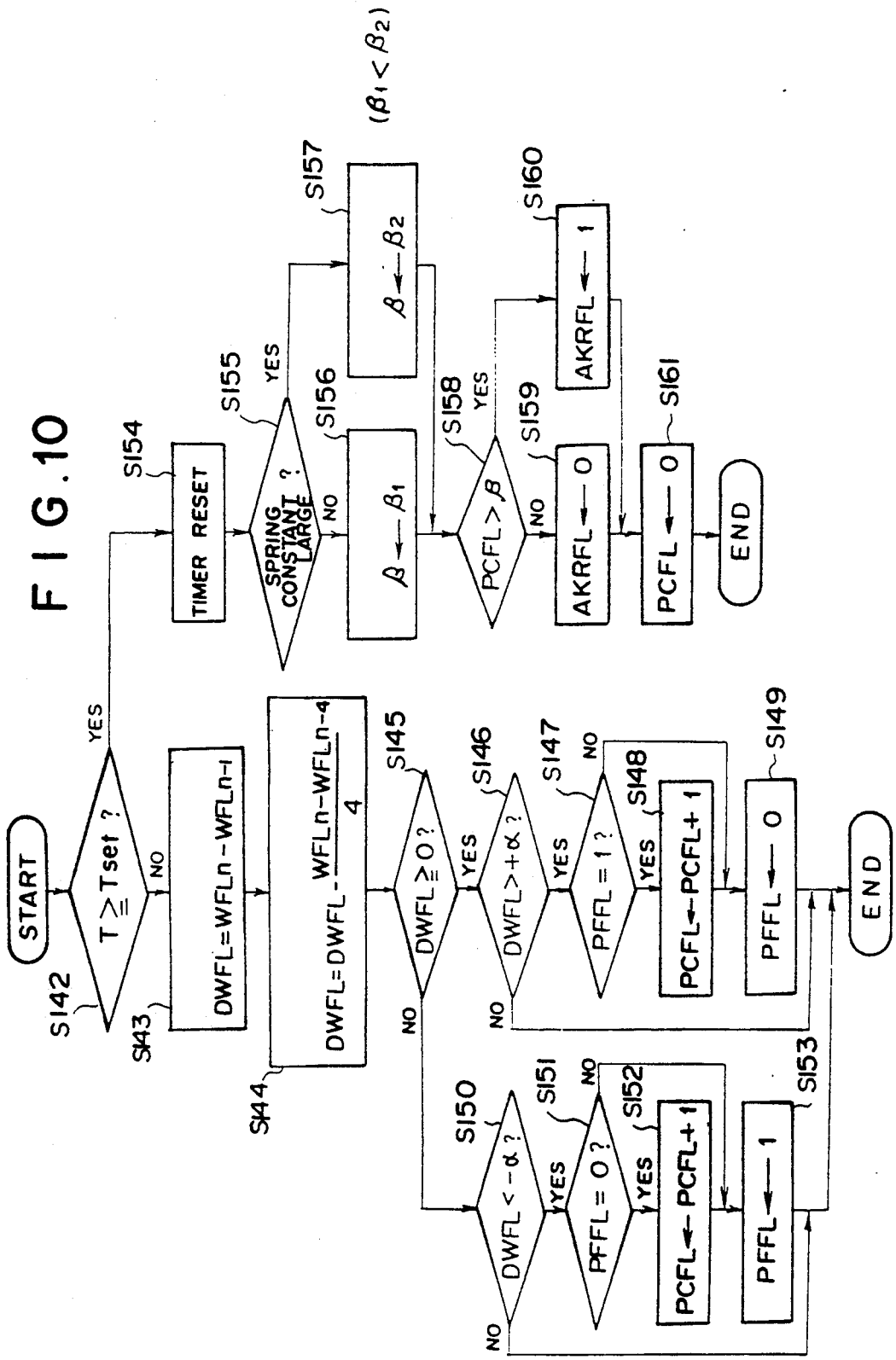

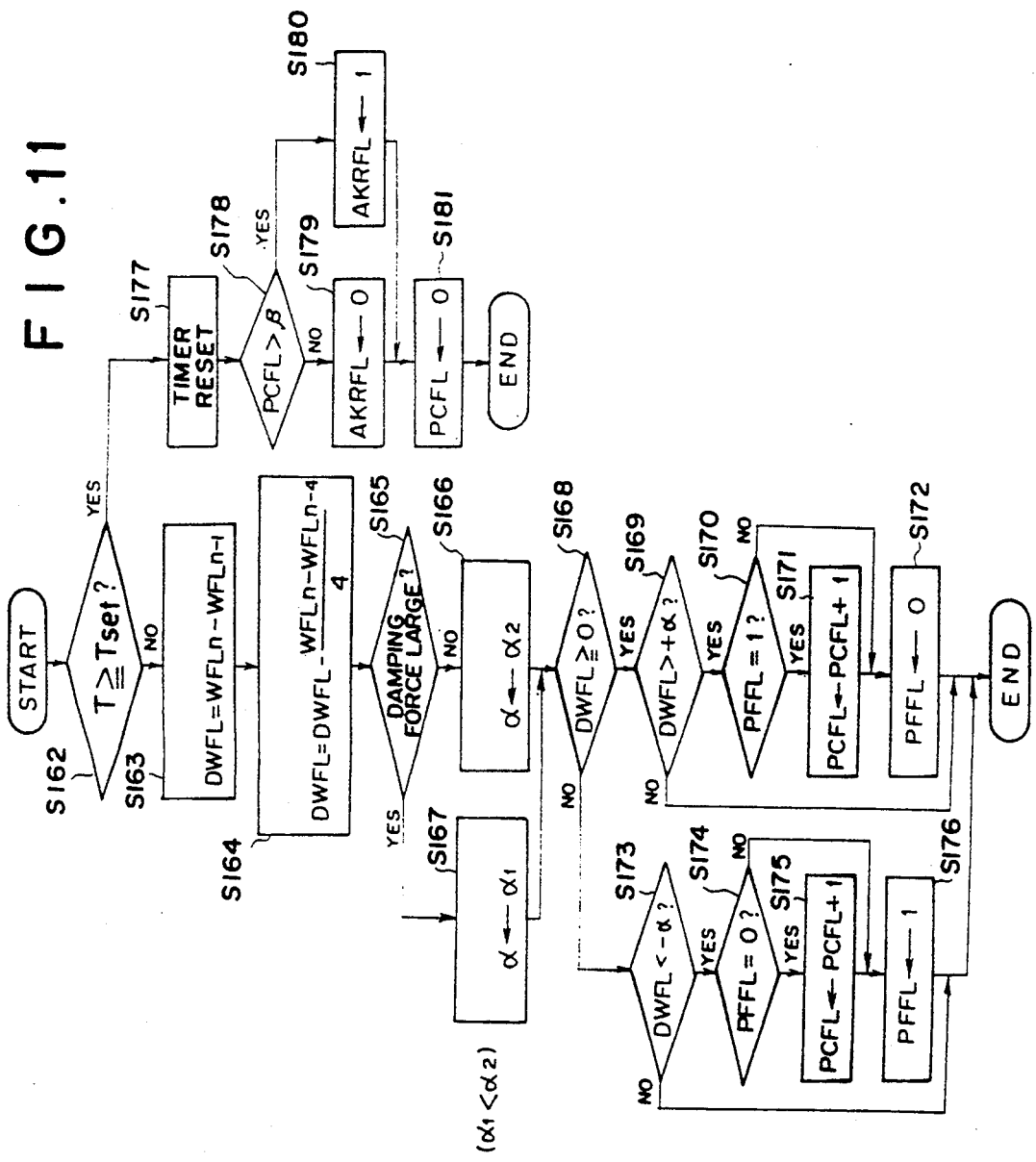

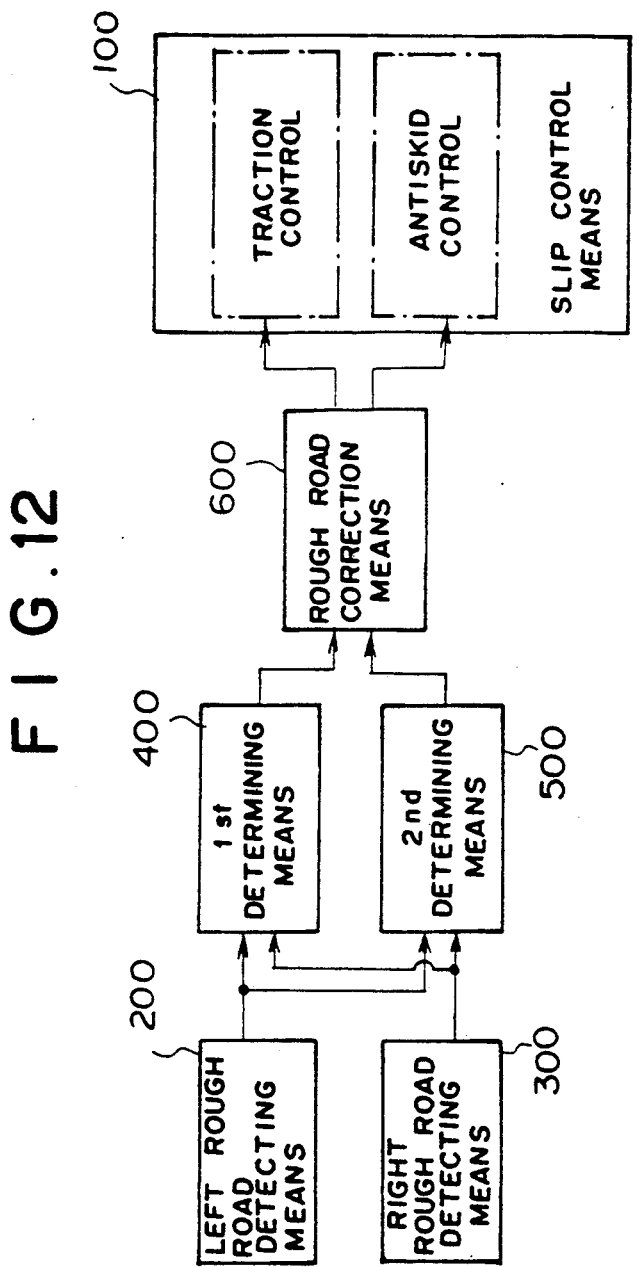

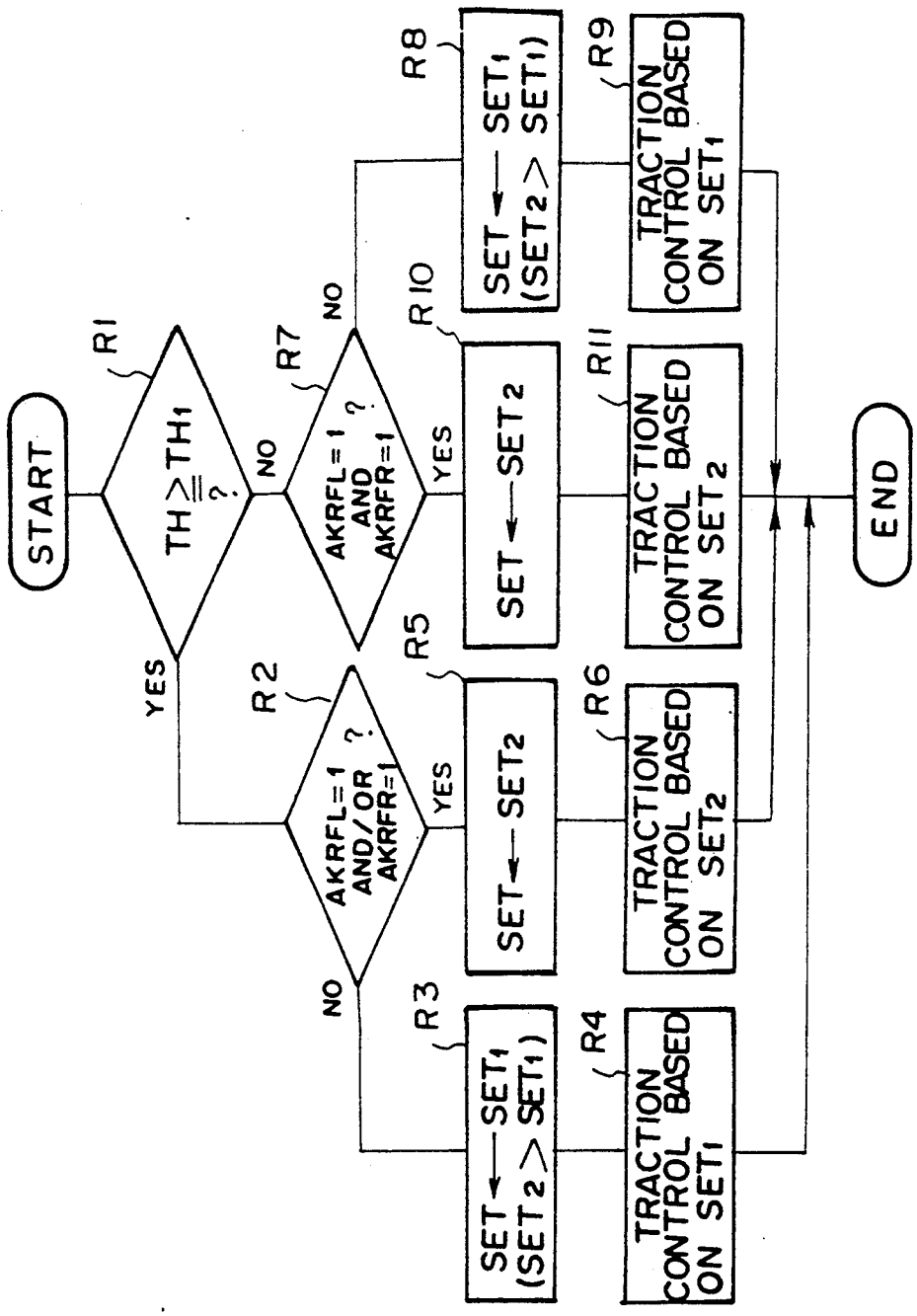

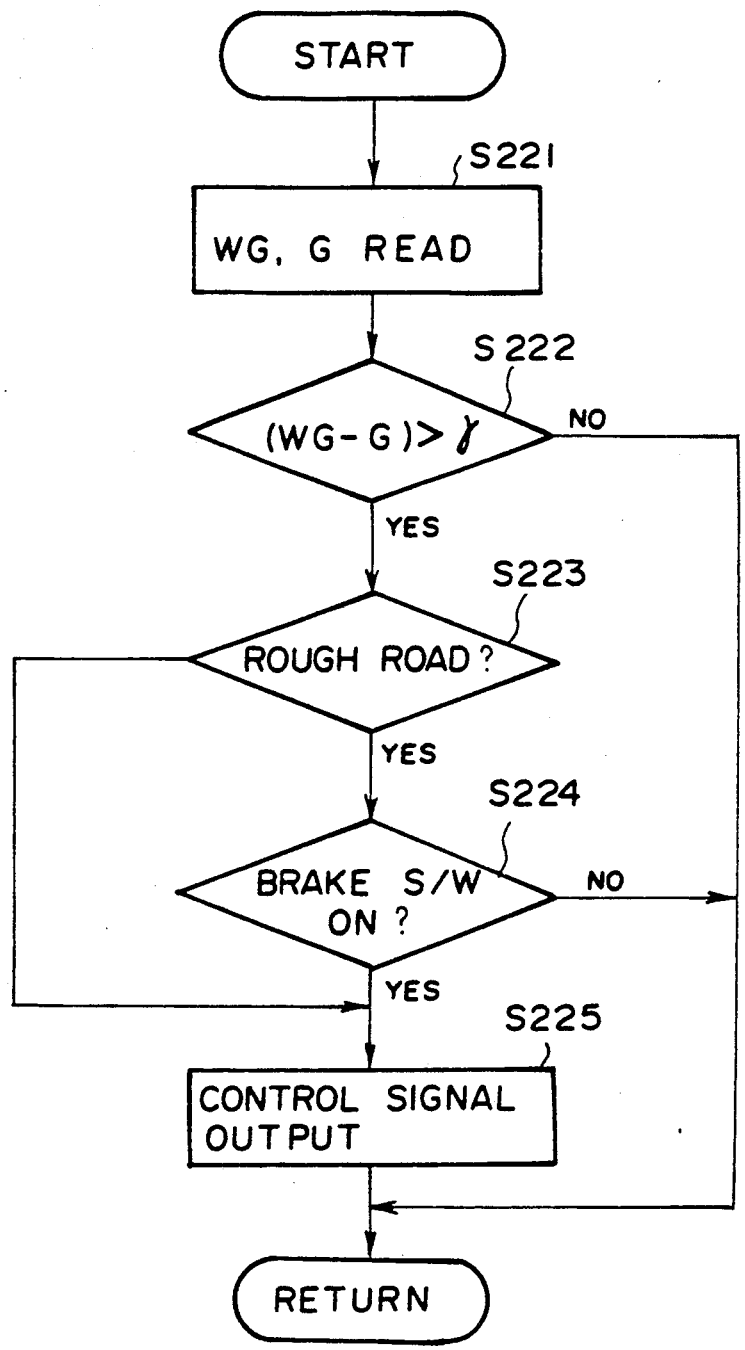

SLIP CONTROL SYSTEM FOR VEHICLE AND ROUGH ROAD DETECTING SYSTEM

BACKGROUND OF THE INVENTION

1. Field of the Invention

This invention relates to a slip control system for a vehicle such as a traction control system or an antiskid control system. This invention also relates to a rough road detecting system for determining whether the vehicle is running a rough road in order to change the manner of the slip control according to whether the vehicle is running a rough road or a smooth road.

2. Description of the Prior Art

There have been put into practice slip control systems for a vehicle such as a traction control system and an antiskid control system.

In the traction control, the slip ratio of the driving wheels of the vehicle is detected, and when the slip ratio exceeds a predetermined threshold value, the engine output power and/or the braking force are controlled (the engine output power is reduced and/or the braking force is increased) so that the slip ratio of the driving wheels converges on a target slip ratio in order to prevent the driving wheels from slipping due to excessively large driving force, for instance, during acceleration, thereby ensuring better acceleration performance.

In the antiskid control, the slip ratio of the wheels of the vehicle is detected, and when the slip ratio exceeds a predetermined threshold value, the braking force is controlled (reduced) so that the slip ratio of the driving wheels converges on a target slip ratio in order to prevent the wheels from locking.

Generally the slip ratio of each wheel is determined on the basis of the peripheral speed of the wheel. Accordingly, in the case of the traction control system, when the vehicle is running a rough road and the peripheral speed of each wheel fluctuates due to unevenness on the road surface, the slip ratio can frequently exceed the predetermined threshold value and the traction control can be performed when the running condition of the vehicle does not require the traction control, whereby the driving force is frequently reduced and the acceleration performance deteriorates.

In the case of the antiskid control system, a more efficient braking can tale place when locking tendency of the wheels is enhanced so that the wheels catch the unevenness on the road surface than when the antiskid control is performed and the slip ratio is converged on the target slip ratio so long as the vehicle is running a rough road.

Thus, in either of the traction control and the antiskid control, it is preferred that the threshold slip ratio be higher to a certain extent when the vehicle is running a rough road than when the vehicle is running a smooth road so that the traction control or the antiskid control becomes less apt to be performed.

In order to change or correct the threshold slip ratio when the vehicle is running a rough road, whether the vehicle is running a rough road must be determined. To correct the threshold slip ratio when the vehicle is running a rough road will be referred to as "the rough road correction", and the means for detecting that the vehicle is running a rough road will be referred to as "rough road detecting means" or "rough road detecting system", hereinbelow.

An example of the rough road detecting system is disclosed, for instance, in Japanese Unexamined Patent Publication No. 64(1989)-29636.

However, with respect to the driving wheels, it is not always preferable to effect the rough road correction when the vehicle is running a rough road. That is, with respect to the driving wheels, the rough road correction should not be effected depending on the running condition of the vehicle (e.g., state of steering, vehicle speed, amount of depression of the accelerator pedal, running mode and the like).

Further preferably the contents of the rough road correction, e.g., how much the threshold slip ratio is to be increased, is determined depending on the running condition of the vehicle.

SUMMARY OF THE INVENTION

In view of the foregoing observations and description, the primary object of the present invention is to provide a slip control system in which the rough road correction can be effected in an optimal manner irrespective of the running condition of the vehicle.

Another object of the present invention is to provide a rough road detecting system which can be optimally employed in the slip control system and can precisely determine whether the vehicle is running a rough road without being affected by running conditions of the vehicle, the properties of the suspension of the vehicle and the like.

In accordance with one aspect of the present invention, there is provided a slip control system for a vehicle comprising a slip ratio detecting means which detects a slip ratio of driving wheels of the vehicle, a driving wheel slip control means which controls slip of the driving wheels with a predetermined controlled variable so that the slip ratio of the driving wheels converges on a predetermined target slip ratio when the slip ratio of the driving wheels as detected by the slip ratio detecting means exceeds a predetermined threshold slip ratio, a rough road detecting means which determines whether the vehicle is running a rough road, a rough road correction means which causes the control of the slip control system to be less effective on the driving wheels at a given slip ratio when the rough road detecting means determines that the vehicle is running a rough road, a running condition detecting means which detects running condition of the vehicle, and a rough road correction control means which controls the rough road correction means on the basis of the running condition as detected by the running condition detecting means.

In this specification, "to cause the control of the slip control system to be less effective on the driving wheels at a given slip ratio" should be broadly interpreted to include "to cause the slip control means not to begin controlling until the slip ratio of the driving wheels exceeds a threshold slip ratio higher than said predetermined threshold slip ratio" and "to reduce the effect of the control of the slip control means on the driving wheels at a given slip ratio even if the slip control means begins controlling when the slip ratio of the driving wheels exceeds the predetermined threshold slip ratio".

For example, the rough road correction means may increase the target slip ratio or the predetermined threshold slip ratio, or may reduce the controlled variable.

The running condition of the vehicle means the yaw rate, the steering angle, the vehicle speed, the amount of depression of the accelerator pedal, the running mode (the traction control mode such as the normal mode or the sport mode), and the like.

As described above, when the rough road correction is effected during the traction control, a larger driving torque is transmitted to the wheels and the driving force acting on the road surface from the wheel is also increases. As the driving force acting on the road surface from the wheel increases, the road gripping force is reduced. Further when the rough road correction is effected during the antiskid control, the wheels tend to lock, and when the driving wheels tend to lock behavior of the vehicle body changes. That is, when the rough road correction is effected in either control, the stability of the vehicle deteriorates.

When the vehicle makes a turn on a rough road, or when the vehicle is running a rough road at high speed, the position of the vehicle body is apt to change sideways. Accordingly, it is preferred that the rough road correction be not effected when the steering angle or the yaw rate is large or when the vehicle speed is high.

In accordance with another aspect of the present invention, there is provided a rough road detecting system for detecting whether a wheel of a vehicle is running a rough road comprising a wheel acceleration detecting means which detects the acceleration of the wheel, a comparing means which compares the frequency at which the acceleration of the wheel oscillates over a predetermined threshold value in a unit time with a predetermined frequency and determines that the wheel is running a rough road when the former is larger than the latter, a braking detecting means which detects application of brake to the wheel, and a threshold value changing means which changes the threshold value according to whether the brake is applied to the wheel so that the threshold value is larger when the brake is applied to the wheel than when the brake is not applied to the wheel.

During braking, the amplitude of the oscillation of the wheel acceleration is enlarged, and accordingly, by enlarging the threshold value while the brake is applied to the wheel, whether the wheel is running a rough road can be precisely detected without being affected by increase in the amplitude due to the braking.

In accordance with still another aspect of the present invention, there is provided a rough road detecting system for detecting whether a vehicle is running a rough road comprising a wheel speed change detecting means which detects the changes in the speed of front and rear wheels of the vehicle, a braking detecting means which detects application of brake to the wheel, and a determining means which determines whether the vehicle is running a rough road on the basis of the change in the speed of at least one of the front and rear wheels characterized in that said determining means determines whether the vehicle is running a rough road on the basis of the change in the speed of the rear wheel at least when the brakes are applied to the front and rear wheels.

Generally the speed of the driving wheels is more apt to be affected by fluctuation in the driving torque. Accordingly, when whether the vehicle is running a rough road is determined on the basis of change in the wheel speed, it is preferred that the determination is made on the basis of change in the wheel speed of the driven wheels. However, since the brakes are generally arranged so that the braking is more effective to the front wheels than to the rear wheels and accordingly the front wheels are more apt to be affected by fluctuation in the braking force and at the same time the front wheels are more apt to lock, it is preferred that whether the vehicle is running a rough road be determined on the basis of change in the wheel speed of the rear wheels when the brake is being applied irrespective of whether the rear wheels are the driving wheels.

In accordance with still another aspect of the present invention, there is provided a rough road detecting system for detecting whether a wheel of a vehicle is running a rough road comprising a wheel acceleration detecting means which detects the acceleration of the wheel, a comparing means which compares the frequency at which the acceleration of the wheel oscillates over a predetermined threshold value in a unit time with a predetermined threshold frequency and determines that the wheel is running a rough road when the former is larger than the latter, a spring constant detecting means which detects the spring constant of a suspension of the wheel, and a threshold frequency changing means which increases the threshold frequency with increase of the spring constant.

The period of the vibration of the wheel becomes shorter, whereby the period of the oscillation of the wheel acceleration becomes shorter, with increase in the spring constant of the suspension. Accordingly, by increasing the threshold frequency with increase in the spring constant of the suspension, whether the vehicle is running a rough road can be precisely detected without being affected by change in the period of the oscillation of the wheel acceleration due to change in the spring constant of the suspension.

In accordance with still another aspect of the present invention, there is provided a rough road detecting system for detecting whether a wheel of a vehicle is running a rough road comprising a wheel acceleration detecting means which detects the acceleration of the wheel, a comparing means which compares the frequency at which the acceleration of the wheel oscillates over a predetermined threshold value in a unit time with a predetermined threshold frequency and determines that the wheel is running a rough road when the former is larger than the latter, a damping force detecting means which detects the damping force of a suspension of the wheel, and a threshold value changing means which reduces the threshold value with increase of the damping force.

The amplitude of the vibration of the wheel becomes smaller, whereby the amplitude of the oscillation of the wheel acceleration becomes smaller, with increase in the damping force of the suspension. Accordingly, by reducing the threshold value with increase in the damping force of the suspension, whether the vehicle is running a rough road can be precisely detected without being affected by change in the amplitude of the oscillation of the wheel acceleration due to change in the damping force of the suspension.

In accordance with a still another aspect of the present invention, there is provided a slip control system for a vehicle comprising a slip control means which controls slip of front and rear wheels of the vehicle, a left rough road detecting means which detects whether the left wheel is running a rough road on the basis of change in the speed of the left wheel, a right rough road detecting means which detects whether the right wheel is running a rough road on the basis of change in the speed of the right wheel, a first determining means which determines that the vehicle is running a rough road when at least one of the left and right rough road detecting means detects that the wheel is running a rough road, a second determining means which determines that the vehicle is running a rough road when the left and right rough road detecting means both detect that the wheel is running a rough road, and a rough road correction means which selects one of the first and second determining means according to the running condition of the vehicle or the kind of the slip control to be effected by the slip control means and changes the contents of the slip control effected by the slip control means when the selected determining means determines that the vehicle is running a rough road.

Which is the better to effect the rough road correction when both the left and right wheels are running a rough road or to effect the rough road correction even when only one of the left and right wheels is running a rough road differs depending on the kind of the slip control to be effected by the slip control or the running condition of the vehicle. Accordingly, by selecting one of the first and second determining means according to the running condition of the vehicle or the kind of the slip control to be effected by the slip control means, an optimal rough road correction can be realized irrespective of the running condition of the vehicle or the kind of the slip control.

BRIEF DESCRIPTION OF THE DRAWINGS

FIG. 10 is a flow chart which shows the manner of determining whether the vehicle is running a rough road in the rough road detecting system of the third example which can be employed in the systems according to the present invention, FIG. 11 is a flow chart which shows the manner of determining whether the vehicle is running a rough road in the rough road detecting system of the fourth example which can be employed in the systems according to the present invention, FIG. 12 is a block diagram for illustrating the function of the slip control unit in a third embodiment of the present invention, FIG. 13 is a flow chart for illustrating the rough road correction in the traction control performed by the slip control unit, FIG. 18 is a flow chart showing the antiskid control performance by the slip control unit.

DESCRIPTION OF THE PREFERRED EMBODIMENT

Figure 1:
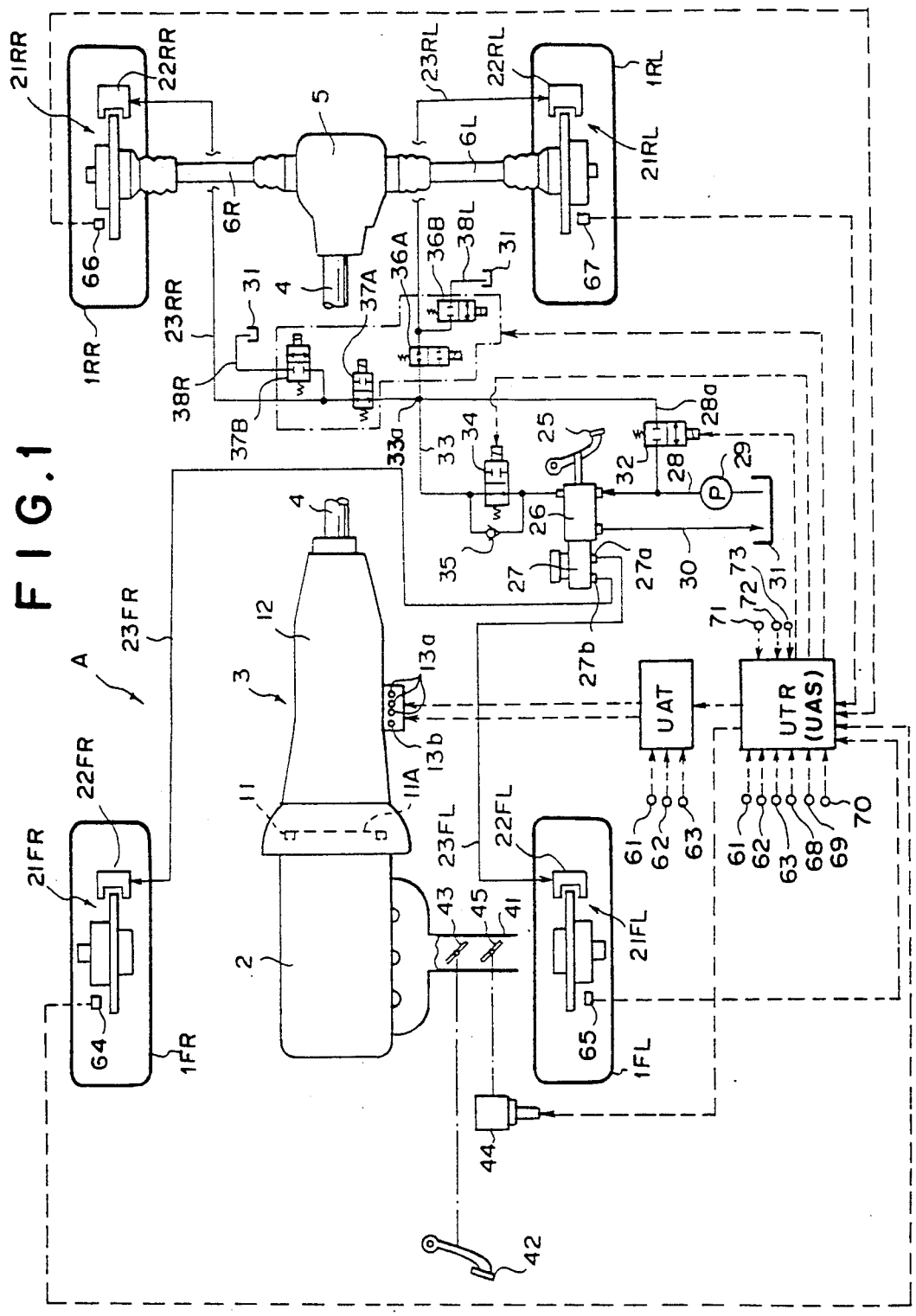
FIG. 1 is a schematic view showing a vehicle provided with a slip control system in accordance with a first embodiment of the present invention.

In FIG. 1, a vehicle A is provided with a traction control means as the slip control means. The vehicle A has an engine 2 mounted on the front part of the vehicle, and the output torque of the engine 2 is transmitted to left and right rear wheels 1RL and 1RR by way of an automatic transmission 3, a propeller shaft 4, a differential 5, and left and right drive shafts 6L and 6R. That is, the vehicle A is a front-engine rear-drive vehicle. Reference numerals 1FL and 1FR respectively denote left and right front wheels.

The automatic transmission 3 comprises a torque converter 11 and a multiple speed transmission gear mechanism 12. Gear-shifting is done by selectively energizing and de-energizing a plurality of solenoids 13a incorporated in a hydraulic control circuit of the transmission gear mechanism 12. Further the torque converter 11 has a lockup clutch 11a which is hydraulically operated and is engaged and disengaged by energizing and de-energizing a solenoid 12b.

The solenoids 13a and 13b are controlled by an automatic transmission control unit UAT. As is well known, the automatic transmission control unit UAT controls the solenoids 13a and 13b according to a predetermined shift pattern and predetermined lockup characteristics on the basis of a main-throttle opening signal which represents the opening of a main throttle valve 43 (to be described later) as detected by a main-throttle opening sensor 61, a sub-throttle opening signal which represents the opening of a sub throttle valve 45 (to be described later) as detected by a sub-throttle opening sensor 62, and a vehicle speed signal which represents the vehicle speed (the rotational speed of the propeller shaft 4 in this particular embodiment) as detected by a vehicle speed sensor 63.

The wheels 1FL, 1FR, 1RL and 1RR are provided with brakes 21FL, 21FR, 21RL and 21RR. The brakes 21FL, 21FR, 21RL and 21RR have wheel cylinders (calipers) 22FL, 22FR, 22RL and 22RR to which brake fluid pressure is applied respectively through brake lines 23FL, 23FR, 23RL and 23RR.

A brake pedal 25 is connected to a tandem master cylinder 27 by way of a power brake booster 26. Brake fluid pressure produced by the master cylinder 27 is transmitted to the left front wheel brake 21FL by way of the brake line 23FL which is connected to a first discharge port 27a of the master cylinder 27 and to the right front wheel brake 21FR by way of the brake line 23FR which is connected to a second discharge port 27b of the master cylinder 27.

Working fluid pressure is applied to the booster 26 from a pump 29 by way of a line 28, and excessive working fluid is returned to a reservoir 31 by way of a return line 30. A branch line 28a branches off from the line 28 and an electro-magnetic on-off valve 32 is provided in the branch line 28a. A line 33 extends from the booster 26 and an electro-magnetic on-off valve 34 is provided in the line 33. A one-way valve 35 is connected to the line 33 in parallel to the electro-magnetic on-off valve 34.

The branch line 28a is connected to the line 33 at a junction 33a, and the brake lines 23RL and 23RR for the left and right rear wheels are connected to the junction 33a. Electro-magnetic on-off valves 36A and 37A are provided respectively in the brake lines 23RL and 23RR, and relief passages 38L and 38R are respectively connected to the brake lines 23RL and 23RR downstream of the on-off valves 36A and 37A. Electro-magnetic on-off valves 36B and 37B are respectively provided in the relief passages 38L and 38R.

The valves 32, 34, 36A, 37A, 36B and 37B are controlled by a slip control unit UTR. That is, when the traction control by the braking control is not effected, the traction control unit UTR closes the valve 32, opens the valve 34, closes the valves 36B and 37B and opens the valves 36A and 37A.

When the brake pedal 25 is pushed down in this state, brake fluid pressure is applied to the front wheel brakes 21FL and 21FR by way of the master cylinder 27 and working fluid pressure of the booster 26 is applied to the rear wheel brakes 21R1 and 21RR as brake fluid pressure.

When the slip ratio of the rear wheels 1RR and 1RL (the driving wheels) increases to such an extent that the traction control by the braking control is to be effected as will be described in detail later, the traction control unit UTR closes the valve 34 and opens the valve 32. Then the traction control unit UTR keeps the brake fluid pressure constant at the pressure at that time, increases the brake fluid pressure and reduces the same by duty-control of the valves 36A, 26B, 37A and 37B. That is, so long as the valve 32 is closed, the brake fluid pressure is kept constant when the valves 36A, 36B, 37A and 37B are all closed, is increased when the valves 36A and 37A are opened with the valves 36B and 37B closed, and is reduced when the valves 36B and 37B are opened with the valves 36A and 37A closed. The brake fluid pressure transmitted through the branch line 28A is prevented from acting on the brake pedal 25 as a counterforce by the one-way valve 35.

When the brake pedal 25 is pushed down while the traction control by the braking control is being effected, the brake fluid pressure is applied to the rear wheel brakes 21RL and 21RR through the one-way valve 35 from the booster 26 according to the amount of depression of the brake pedal 25.

The traction control unit UTR effects the traction control by control of the engine output power in addition to the traction control by the braking control. For this purpose, the main throttle valve 43 and the sub throttle valve 45 are provided in the intake passage 41, the former being connected to the accelerator pedal 42 and the latter being connected to an actuator 44. The sub throttle valve 45 is controlled by the traction control unit UTR by way of the actuator 44.

Output signals from wheel sensors 64 to 67 for detecting the speed of the respective wheels 1FL, 1FR, 1RL and 1RR are input into the traction control unit UTR, and the main-throttle opening signal from the main-throttle opening sensor 61, the sub-throttle opening signal from sub-throttle opening sensor 62, the vehicle speed signal from the vehicle speed sensor 63, an accelerator position signal from an accelerator position sensor 68 which detects the amount of depression of the accelerator pedal 42, a yaw rate signal from a yaw rate sensor 69, a shift position signal from a shift position sensor 70, a steering angle signal from a steering angle sensor 71 and a mode signal from a mode selection switch 72 which is manually operated are further input into the traction control unit UTR.

The traction control unit UTR comprises an input interface which receives these signals, a microcomputer having a CPU, a ROM and a RAM, an output interface, and a driving circuit which drives the valves 32, 34, 36A, 37A, 36B and 37B and the actuator 44. Control programs for the traction control and various maps are stored in the ROM, and various memories required for the control are provided in the RAM.

The traction control performed by the traction control unit UTR will be described with reference to FIG. 2, hereinbelow.

Figure 2:
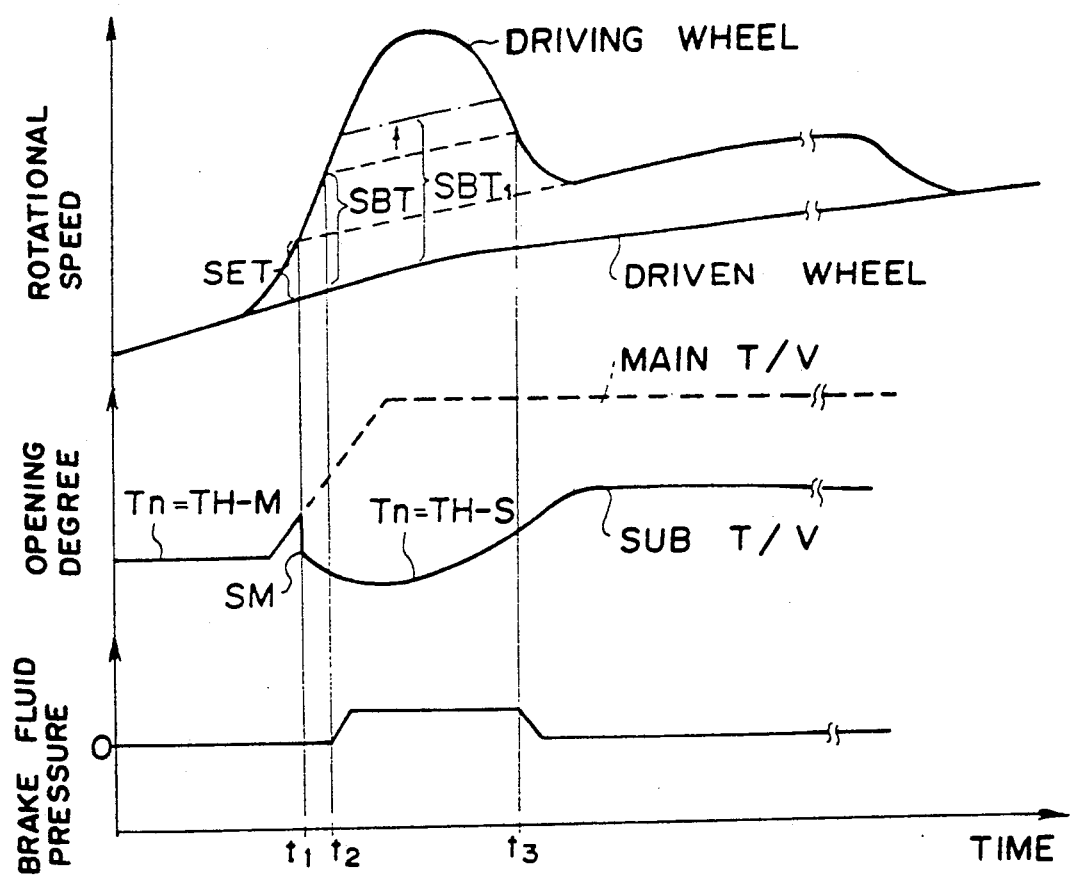
FIG. 2 is a time chart for illustrating the basic traction control.

In FIG. 2, SET denotes a first threshold slip ratio for beginning the traction control by the engine output power control and SBT denotes a second threshold slip ratio for beginning the traction control by the braking control. That is, when the slip ratio of the driving wheels exceeds the first threshold slip ratio SET, the traction control unit UTR begins the engine output power control and when the slip ratio of the driving wheels exceeds the second threshold slip ratio SBT, the traction control unit UTR begins the braking control. The second threshold slip ratio SBT is larger than the first threshold slip ratio SET. In this particular embodiment, when the slip ratio exceeds the first threshold slip ratio SET, the traction control unit UTR controls the engine output power so that the slip ratio of the driving wheels converges on a first target slip ratio which is equal to the first threshold slip ratio SET, and when the slip ratio exceeds the second threshold slip ratio SBT, the traction control unit UTR controls the braking so that the slip ratio converges on a second target slip ratio which is equal to the second threshold slip ratio SBT. Accordingly, SET denotes sometimes the first threshold slip ratio SET and sometimes the first target slip ratio and SBT denotes sometime the second threshold slip ratio SBT and sometimes the second target slip ratio, hereinbelow.

In FIG. 2, until time t1, the slip ratio of the driving wheels is not so large and accordingly, the engine output power control is not effected and the sub throttle valve 45 is kept wide open. While the engine output power control is not effected, the effective throttle opening Tn (governed by the smaller one of the degrees of opening of the main throttle valve 43 and the sub throttle valve 45) corresponds to the opening TH-M of the main throttle valve 43 and the amount of depression of the accelerator pedal 42.

When the slip ratio of the driving wheels exceeds the first threshold slip ratio SET, the traction control unit UTR begins the engine output power control and causes the actuator 44 to close the sub throttle valve 45, whereby the effective throttle opening Tn is abruptly reduced to a lower limit control value SM. Thereafter the traction control unit UTR feedback-controls the sub throttle valve opening TH-S so that the slip ratio of the driving wheels converges on the first target slip ratio SET. After beginning of the engine output power control, the sub throttle valve opening TH-S becomes smaller than the main throttle valve opening TH-M, and accordingly the effective throttle opening Tn is equal to the sub throttle valve opening TH-S.

When the slip ratio cannot be sufficiently reduced solely by the engine output power control, the slip ratio continues to increase and exceeds the second threshold slip ratio SBT at time t2.

When the slip ratio of the driving wheels exceeds the second threshold slip ratio SBT, the traction control unit UTR begins to the braking control in addition to the engine output power control and applies the brake fluid pressure to the brakes 21RL and 21RR for the driving wheels or the rear wheels 1RL and 1RR. The traction control unit UTR feedback-controls the brake fluid pressure so that the slip ratio of the driving wheels converges on the second target slip ratio SBT.

When the slip ratio of the driving wheels falls below the second threshold slip ratio SBT, the traction control unit UTR reduces the brake fluid pressure to zero and terminates the braking control though it still continues the engine output power control.

The first threshold slip ratio SET (or the first target slip ratio) and the second threshold slip ratio SBT (or the second target slip ratio) may be suitably determined by the traction control unit UTR on the basis of various factors such as the friction coefficient $\mu$ of the road surface, the vehicle speed, the amount of depression of the accelerator pedal 42, the steering angle, the running mode (e.g., sport type running mode or hard running mode) and the like. Further also the lower limit control value SM may be suitably determined by the traction control unit UTR on the basis of, for instance, the friction coefficient $\mu$ of the road surface.

The braking control is effected on the left and right driving wheels separately from each other on the basis of the slip ratios SL and SR of the respective driving wheels. On the other hand, the engine output power control is effected on the basis of the larger one SE of the slip ratios SL and SR of the respective driving wheels. The traction control unit UTR calculates the slip ratios SL and SR according to the following formulae on the basis of the output signals of the wheel speed sensors 64 to 67.

$$SL = (VKL - VJ)/VJ$$

$$SR = (VKR - VJ)/VJ$$

wherein VKL represents the rotational speed of the left driving wheel, VKR represents the rotational speed of the right driving wheel and VJ represents the average of the rotational speeds VKL and VKR of the left and right driving wheels.

The slip ratios SL and SR need not be limited to those calculated according to the above formulae but may be any kind of values so long as they reflects slip of the driving wheels. For example they may be values obtained by simply subtracting the rotational speed of the driven wheels from that of the driving wheels.

The traction control unit UTR normally effects the traction control in the manner described above, and effects the rough road correction, i.e., increases the threshold slip ratio, when it is determined that the vehicle is running a rough road while refraining from effecting the rough road correction when the running condition of the vehicle does not permit.

Figure 3:
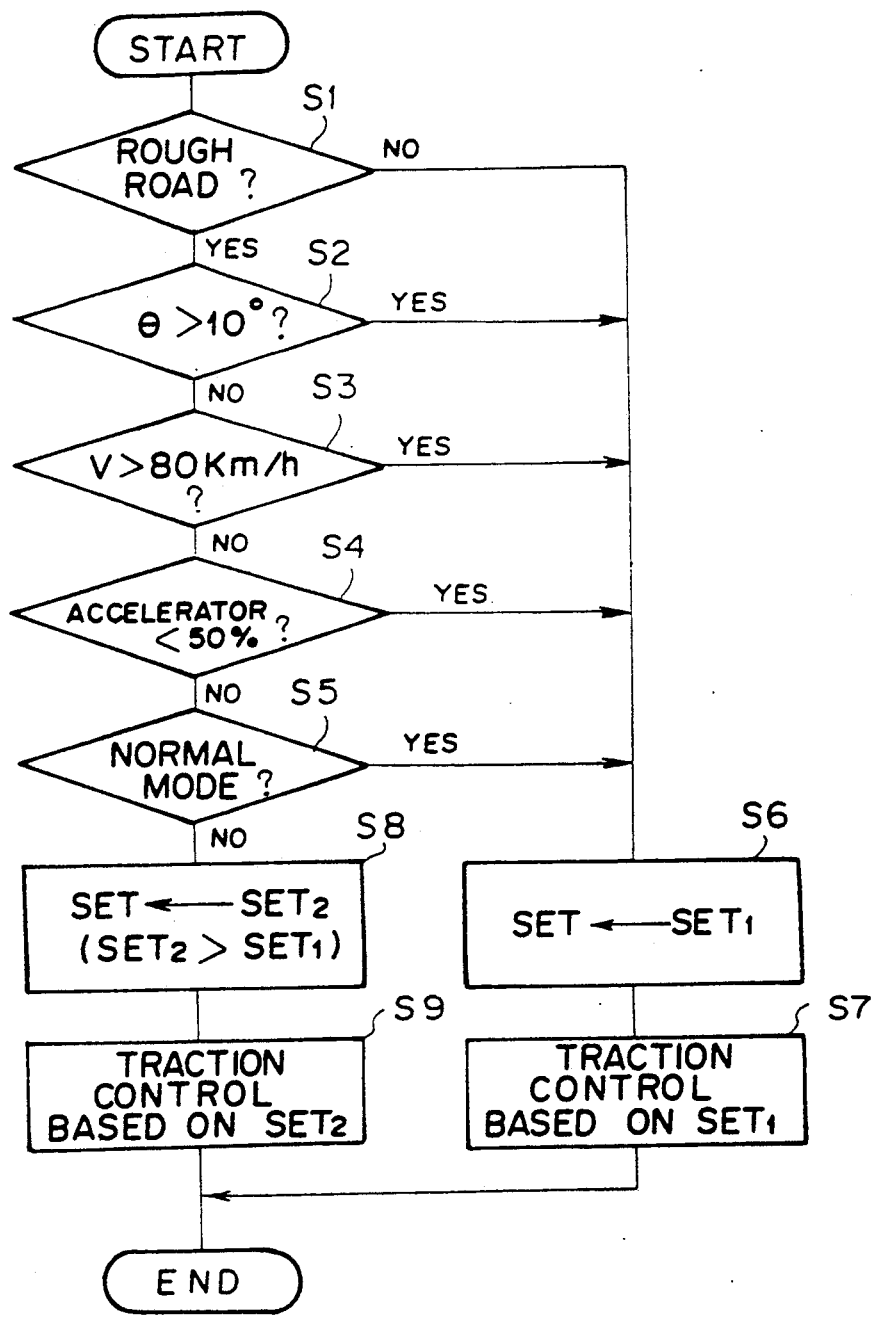
FIG. 3 is a flow chart of the traction control which is performed by the slip control unit in the first embodiment.

FIG. 3 is a flow chart for illustrating the operation of the traction control unit UTR.

The traction control unit UTR first determines whether the vehicle is running a rough road. (step S1) When it is determined in step S1 that the vehicle is not running a rough road, the traction control unit UTR sets the first threshold slip ratio SET (first target slip ratio) to a normal value SET1 and effects the traction control based on the value SET1 of the first threshold slip ratio SET. (steps S6 and S7) Basically the traction control unit UTR effects the rough road correction, i.e., sets the first threshold slip ratio SET to a corrected value SET2 which is larger than the normal value SET1 (step S8) and effects the traction control based on the value SET2 of the first threshold slip ratio SET (step S9), when it is determined in step S1 that the vehicle is running a rough road. However the traction control unit UTR refrains from effecting the rough road correction when the steering angle $\theta$ as detected by the steering angle sensor 71 is larger than 10°, when the vehicle speed V as detected by the vehicle speed sensor 63 is higher than 80 Km/h, when the amount of depression of the accelerator pedal as detected by the accelerator position sensor 68 is smaller than 50% or when normal running mode has been selected. (steps S2 to S5) Which mode is selected is detected by a running mode selection switch 72. In this embodiment, the running mode is selected from normal running mode and sport running mode, and in the sport running mode, importance is more attached to the acceleration performance than in the normal running mode.

Though only the first threshold slip ratio SET is increased when the vehicle is running a rough road in this embodiment, both the first and second threshold slip ratios SET and SBT may be increased or the second threshold slip ratio SBT may be increased instead of the first threshold slip ratio SET. In the case where the first target slip ratio differs from the first threshold slip ratio, either one of them may be increased, or both of them may be increased. Further, in the case where the second target slip ratio differs from the second threshold slip ratio, either one of them may be increased.

Whether the vehicle is running a rough road may be determined (step S1), for instance, in the following manner.

Figure 4:
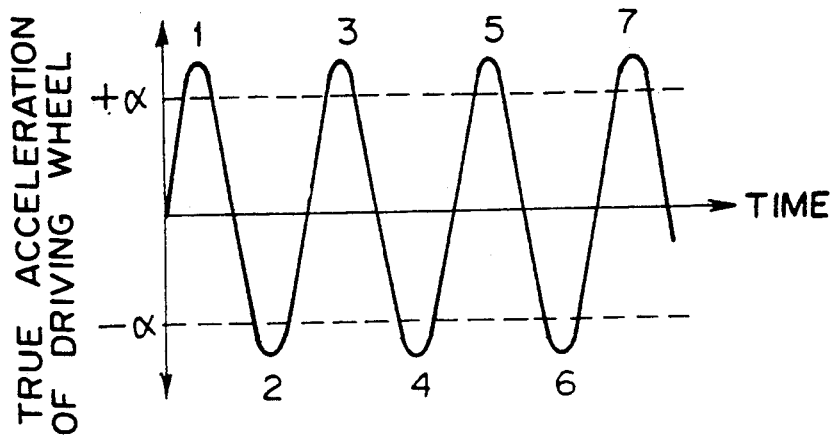
FIG. 4 is a view for illustrating the manner of determining whether the vehicle is running a rough road.

That is, since the acceleration of the driving wheel fluctuates due to unevenness of the road when the vehicle is running a rough road, the acceleration of the driving wheel is first obtained on the basis of the rotational speed of the driving wheel. Since the acceleration of the driving wheel includes the acceleration of the vehicle, the acceleration of the vehicle is subtracted from the acceleration of the driving wheel in a suitable manner to obtain the true acceleration of the driving wheel and the change with time of the true acceleration, i.e., the oscillation of the true acceleration, is obtained. As shown in FIG. 4, when the true acceleration of the driving wheel oscillates over a predetermined threshold value $\alpha$ more than a predetermined number of times $\beta$ in a unit time, it is determined that the vehicle is running a rough road.

As can be understood from the description above, in the slip control system (traction control system) of this embodiment, the rough road correction is not effected when the steering angle is large or when the vehicle speed is high even if the vehicle is running a rough road, and accordingly, there is no fear that stability of the vehicle is lost due to the rough road correction during cornering or travel at high speed. Further, when the amount of depression is relatively small or when the normal mode has been selected where it can be considered that the driver does not want better acceleration performance, the rough road correction is not effected even if the vehicle is running a rough road, and accordingly, traction control which conforms to the driver's will can be realized. On the other hand, when the steering angle is small, the vehicle speed is intermediate or low, the amount of depression of the accelerator pedal is large and at the same time, the normal mode has been selected, that is, when there is no fear that the rough road correction adversely affects the stability of the vehicle to a large extent and at the same time the driver wants better acceleration performance, the rough road correction is effected and the acceleration performance is improved.

A second embodiment of the present invention in which the present invention is applied to the antiskid control system will be described, hereinbelow.

The mechanical arrangement of the second embodiment is substantially the same as that of the first embodiment except that the operation of the slip control unit, i.e., the traction control unit UTR in the first embodiment, differs from that in the first embodiment. Accordingly, only the operation of the slip control unit will be described with reference to FIG. 5, hereinbelow. In the second embodiment, the traction control unit UTR in FIG. 1 should be reread as an antiskid control unit UAS.

Figure 5:
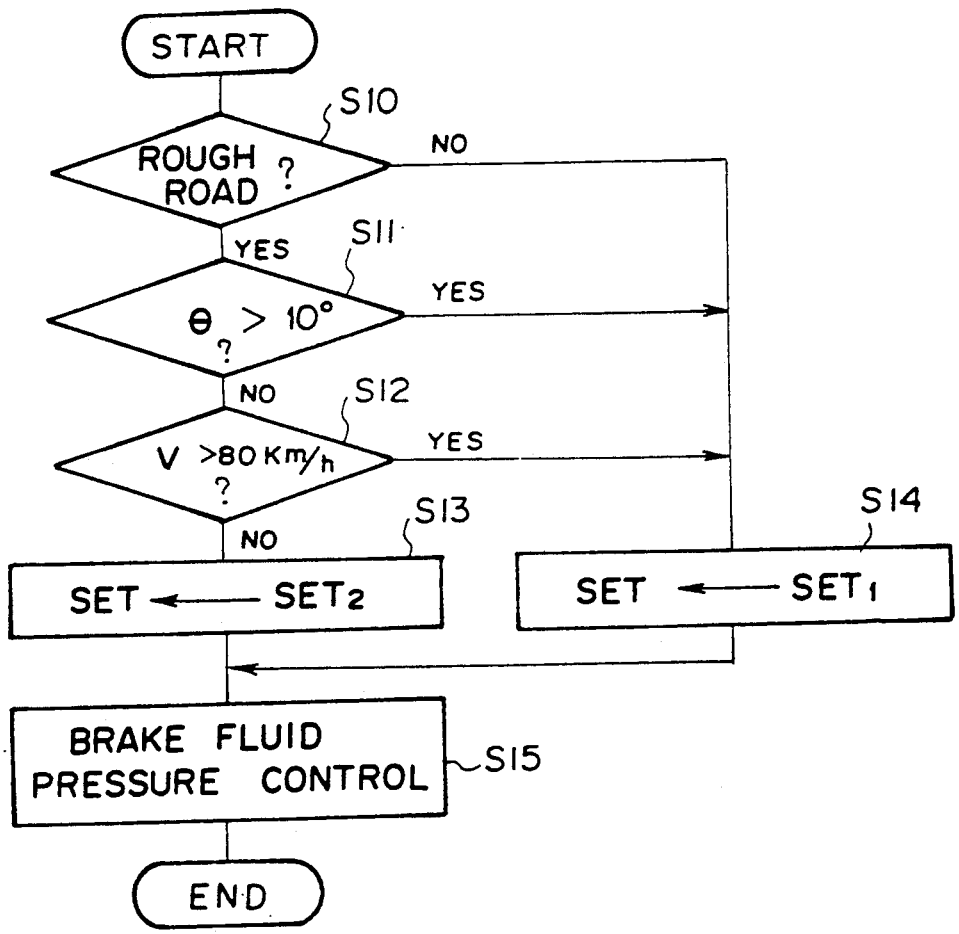
FIG. 5 is a flow chart of the antiskid control which is performed by the antiskid control unit in a second embodiment of the present invention where an antiskid control means is employed as the slip control means.

As shown in FIG. 5, the antiskid control unit UAS first determines whether the vehicle is running a rough road and when it is determined that the vehicle is not running a rough road, the antiskid control unit UAS begins the antiskid control when the slip ratio of the wheel exceeds a normal threshold slip ratio SET1 (e.g., 0.2) and controls the brake fluid pressure so that the slip ratio of the wheel converges on a normal target slip ratio which is equal to the normal threshold slip ratio. That is, the antiskid control unit UAS sets the threshold slip ratio SET to the normal value SET1. (steps S10, S14 and S15) On the other hand, when it is determined in step 10 that the vehicle is running a rough road, the antiskid control unit UAS determines whether the steering angle $\theta$ is larger than 10° and whether the vehicle speed is higher than 80 Km/h (steps S11 and S12) and when the steering angle $\theta$ is not larger than 10° and at the same time the vehicle speed is not higher than 80 Km/h, the antiskid control unit UAS effects the rough road correction. That is, antiskid control unit UAS begins the antiskid control when the slip ratio exceeds a corrected threshold slip ratio (e.g., 0.3) which is larger than the normal threshold slip ratio and controls the brake fluid pressure so that the slip ratio of the wheel converges on a corrected target slip ratio which is equal to the corrected threshold slip ratio. That is, the antiskid control unit UAS sets the threshold slip ratio SET to the corrected value SET2. (steps S10, S11, S12, S13 and S15) When the steering angle $\theta$ is larger than 10° or when the vehicle speed is higher than 80 Km/h, the antiskid control unit UAS does not effect the rough road correction and effects the antiskid control using the normal threshold slip ratio and the normal target slip ratio.

In the slip control system (antiskid control system) of this embodiment, the rough road correction is not effected when the steering angle is large or when the vehicle speed is high even if the vehicle is running a rough road, and accordingly, there is no fear that stability of the vehicle is lost due to the rough road correction during cornering or travel at high speed. On the other hand, when the steering angle is small and the vehicle speed is intermediate or low, that is, when there is no fear that the rough road correction adversely affects the stability of the vehicle to a large extent, the rough road correction is effected and the braking performance is improved.

In the slip control system of the present invention, whether the vehicle is running a rough road may be determined in the various manners. Several examples of the rough road detecting system which detect whether the vehicle is running a rough road in a manner which is more preferable than that described above in conjunction with step S1 in FIG. 3 will be described hereinbelow.

The manner of detecting whether the vehicle is running a rough road described above in conjunction with step S1 in FIG. 3 is disadvantageous in the following point.

That is, the behavior of the wheels changes depending upon not only whether the vehicle is running a rough road or a smooth road but also braking and properties of the suspension (the spring constant and/or the damping capacity of the damper). For example, torque fluctuation is produced during braking due to fluctuation in the braking force, and accordingly, the oscillation of the wheel acceleration during braking has the oscillation of the wheel acceleration due to the rough road plus that due to the braking. Such oscillation of the wheel acceleration due to braking is especially remarkable during braking in the traction control or the antiskid control though it is also produced during braking by depression of the brake pedal. Further when the properties of the suspension change, the period and/or the amplitude of the oscillation of the wheel change, whereby the oscillation of the wheel acceleration is changed in its extent.

Accordingly, in the manner of detecting whether the vehicle is running a rough road described above in conjunction with step S1 in FIG. 3 where the threshold values $\alpha$ and $\beta$ are fixed, whether the vehicle is running a rough road cannot be precisely determined when the brakes are applied or the properties of the suspension changes. The rough road detecting systems which will be described below are free from such drawbacks.

In the first example, the wheel accelerations of the left and rear front wheels which are the driven wheels of a front-engine rear-drive vehicle are detected, and the frequency at which the acceleration of each wheel oscillates over a predetermined threshold value $\alpha$ in a unit time is compared with a predetermined frequency $\beta$. When at least one of the frequencies for the left and right front wheels is larger than the predetermined frequency $\beta$, it is determined that the vehicle is running a rough road. The threshold value $\alpha$ is set to be larger when the antiskid control is being effected than when the antiskid control is not being effected. Whether the antiskid control is being effected is detected, for instance, by an antiskid control detecting means which receives a control signal from the ABS. The manner of detecting whether the vehicle is running a rough road in the first example will be described in more detail with reference to flow charts shown in FIGS. 6 and 7, hereinbelow.

In step S101, it is determined whether the count T of timer is not smaller than a predetermined value Tset, that is, a predetermined time (e.g., 0.7 seconds) has lapsed. When it is determined that the former is smaller than the latter, the acceleration of the left front wheel DWFL is calculated in step S102 by subtracting the preceding speed of the left front wheel WFLn from the present speed of the left front wheel WFLn−1. That is, DWFL=WFLn−WFLn−1.

Then is step 103, offset correction of the acceleration of the left front wheel DWFL is effected according to the following formula.

$$DWFL = DWFL - (WFLn - WFLn-4)/4$$

This offset correction is for obtaining the true acceleration of the wheel. The acceleration of the left front wheel DWFL as calculated in step S102 includes the acceleration of the vehicle body and accordingly, by subtracting the acceleration of the vehicle body from the acceleration of the left front wheel DWFL as calculated in step S102, the true acceleration of the left front wheel DWFL can be obtained. The vehicle body begins to move after a time lag from the time the wheels begin to rotate. The time lag is about 56 msec and is substantially equal to four cycles of this flow (14 msec/cycle). Accordingly, in the above formula, the average of the preceding four accelerations of the wheel (WFLn−WFLn−4)/4 is adopted as the acceleration of the vehicle body.

After the true acceleration of the left front wheel DWFL is thus obtained, it is determined whether the antiskid control is being effected and when it is determined that the antiskid control is being effected, the threshold value $\alpha$ is set to 0.70 G while otherwise the threshold value $\alpha$ is set to 0.50 G. (steps S104 to S106)

Then the frequency PCFL at which the true acceleration of the left front wheel DWFL oscillates over the threshold value $\alpha$ set in step S106 or step S105 is counted. That is, when the oscillation (change with time) of the true acceleration of the left front wheel DWFL is as shown in FIG. 4, the frequency at which the peak of the oscillation exceeds $+\alpha$ or $-\alpha$ is counted, and as shown in FIG. 3, the count is incremented only when the peak alternately exceeds $+\alpha$ and $-\alpha$. That is, when one peak exceeds $+\alpha$ and then the next peak exceeds $+\alpha$ again, or when one peak exceeds $-\alpha$ and then the next peak exceeds $-\alpha$ again, the count is incremented only by one. This is because when the true acceleration of the left front wheel DWFL oscillates due to a rough road, the peak should alternately exceed $+\alpha$ and $-\alpha$. By counting the frequency PCFL in this manner, whether the vehicle is running a rough road can be determined more precisely.

That is, it is determined in step S107 whether the true acceleration of the left front wheel DWFL is not smaller than 0. When it is determined that the true acceleration of the left front wheel DWFL is not smaller than 0, it is determined in step S108 whether true acceleration of the left front wheel DWFL is larger than $+\alpha$. When the answer to this question is NO, the flow is ended, and otherwise, it is determined in step S109 whether peak flag PFFL is 1. That the peak flag PFFL is 1, i.e., the peak flag PFFL has been set, means that the true acceleration of the left front wheel DWFL exceeds $-\alpha$ in the preceding flow and the count of the frequency PCFL has been incremented by one. On the other hand, that the peak flag PFFL is 0, i.e., the peak flag PFFL has been reset, means that the true acceleration of the left front wheel DWFL exceeds $+\alpha$ in the preceding flow and the count of the frequency PCFL has been incremented by one. Accordingly, when it is determined in step S109 that the peak flag PFFL is 1, the count of the frequency PCFL is incremented by one in step S110 and then the peak flag PFFL is reset to 0 in step S111. Thereafter the flow is ended. Otherwise, the flow is ended after step S111 in order to prevent one peak from counting twice and for the purpose described above.

When it is determined in step S107 that the true acceleration of the left front wheel DWFL is smaller than 0, it is determined in step S112 whether the true acceleration of the left front wheel DWFL is smaller than $-\alpha$. When the answer to this question is NO, the flow is ended, and otherwise, it is determined in step S113 whether peak flag PFFL is 0. When it is determined in step S113 that the peak flag PFFL is 0, the count of the frequency PCFL is incremented by one in step S114 and then the peak flag PFFL is set to 1 in step S115. Thereafter the flow is ended. Otherwise, the flow is ended after step S115 in order to prevent one peak from counting twice and for the purpose described above.

The steps S101 to S115 are repeated until the predetermined time lapses, and when the predetermined time has lapsed, it is determined in step S117 whether the frequency PCFL is larger than the predetermined frequency $\beta$ (e.g., $\beta=10$) after the timer is reset in step S116. When it is determined that the frequency PCFL is not larger than the predetermined frequency $\beta$, left front rough road flag AKRFL is set to 0 and the flow is ended after the frequency PCFL is set to 0 in step S119. The left front rough road flag AKRFL indicates that the left front wheel is running a rough road when it is 1 and indicates that the left front wheel is not running a rough road when it is 0. When it is determined in step S117 that the frequency PCFL is larger than the predetermined frequency $\beta$, the left front rough road flag AKRFL is set to 1 in step S120 and the flow is ended after the frequency PCFL is set to 0 in step S119.

Figure 6:
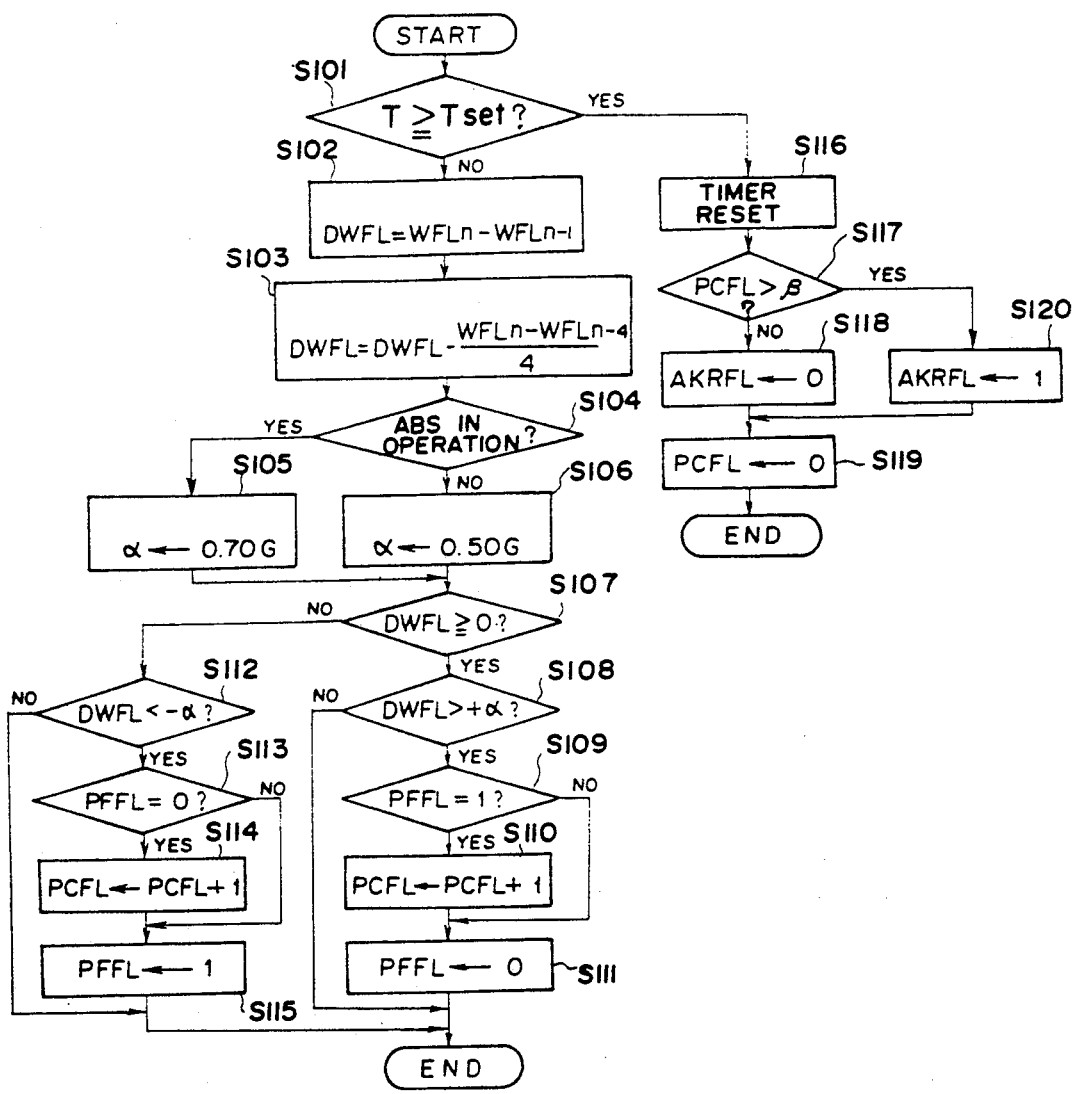
FIG. 6 and 7 are flow charts which show the manner of determining whether the vehicle is running a rough road in the rough road detecting system of the first example which can be employed in the systems according to the present invention.

Though the flow chart shown in FIG. 6 shows the manner of determining whether the left front wheel is running a rough road, whether the right front wheel is running a rough road is determined in the same manner, and right front rough road flag AKRFR is set to 1 when it is determined that the right wheel is running a rough road and to 0 when it is determined that the right front is not running a rough road.

Figure 7:
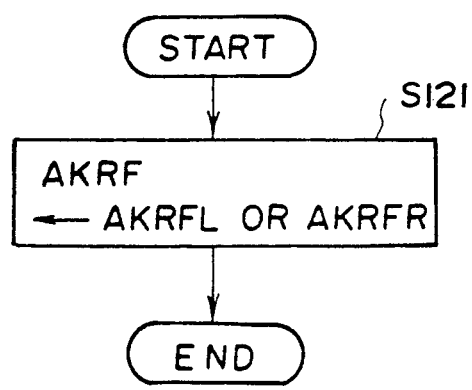

In this example, when it is determined that at least one of the left and front wheels is running a rough road, it is determined that the vehicle is running a rough road and vehicle rough road flag AKRF is set in step S121 in FIG. 7.

Though, in the first example, it is determined that the vehicle is running a rough road when at least one of the left front rough road flag AKRFL and the right front rough road flag AKRFR is 1, it may be determined that the vehicle is running a rough road only when the left front rough road flag AKRFL and the right front rough road flag AKRFR are both 1. Further though, in the first example, whether the vehicle is running a rough road is determined on the basis of the acceleration of the driven wheels, it may be determined on the basis of the acceleration of the driving wheels in the same manner as in the first example, or it may be determined on the basis of the acceleration of the four wheels in the same manner as in the first example.

Further, though, in the first example, the threshold value $\alpha$ is changed according to whether the antiskid control is being effected, it may be changed according to whether the brake pedal is being pushed down or according to whether the braking control is being effected in the traction control.

Further, though, in the first example, the threshold value α is changed or not changed according to whether the antiskid control is being effected, the threshold value α may be changed stepwise or continuously according to other factors.

The absolute value of the threshold value α for the plus side oscillation and that for the minus side oscillation may differ from each other. The absolute value of the threshold value α for the plus side oscillation and that for the minus side oscillation may be increased by different amounts when the antiskid control is being effected, or only one of the absolute value of the threshold value α for the plus side oscillation and that for the minus side oscillation may be increased when the antiskid control is being effected.

In the rough road detecting system of the first example, whether the vehicle is running a rough road can be precisely determined without being affected by change in the oscillation of the wheel accelerations due to the antiskid control.

The second example of the rough road detecting system will be described with reference to FIGS. 8 and 9, hereinbelow.

In the second example, the wheel accelerations of the four wheels of a front-engine rear-drive vehicle are detected, and when the antiskid control is not being effected, whether the vehicle is running a rough road is determined on the basis of the accelerations of the left and right front wheels, i.e., the driven wheels, in the same manner as that in the first example except that the threshold value α is not changed according to whether the antiskid control is being effected, and when the antiskid control is being effected, whether the vehicle is running a rough road is determined on the basis of the accelerations of the left and right rear wheels, i.e., the driving wheels, in the same manner as that in the first example except that the threshold value α is not changed according to whether the antiskid control is being effected.

Figure 8:
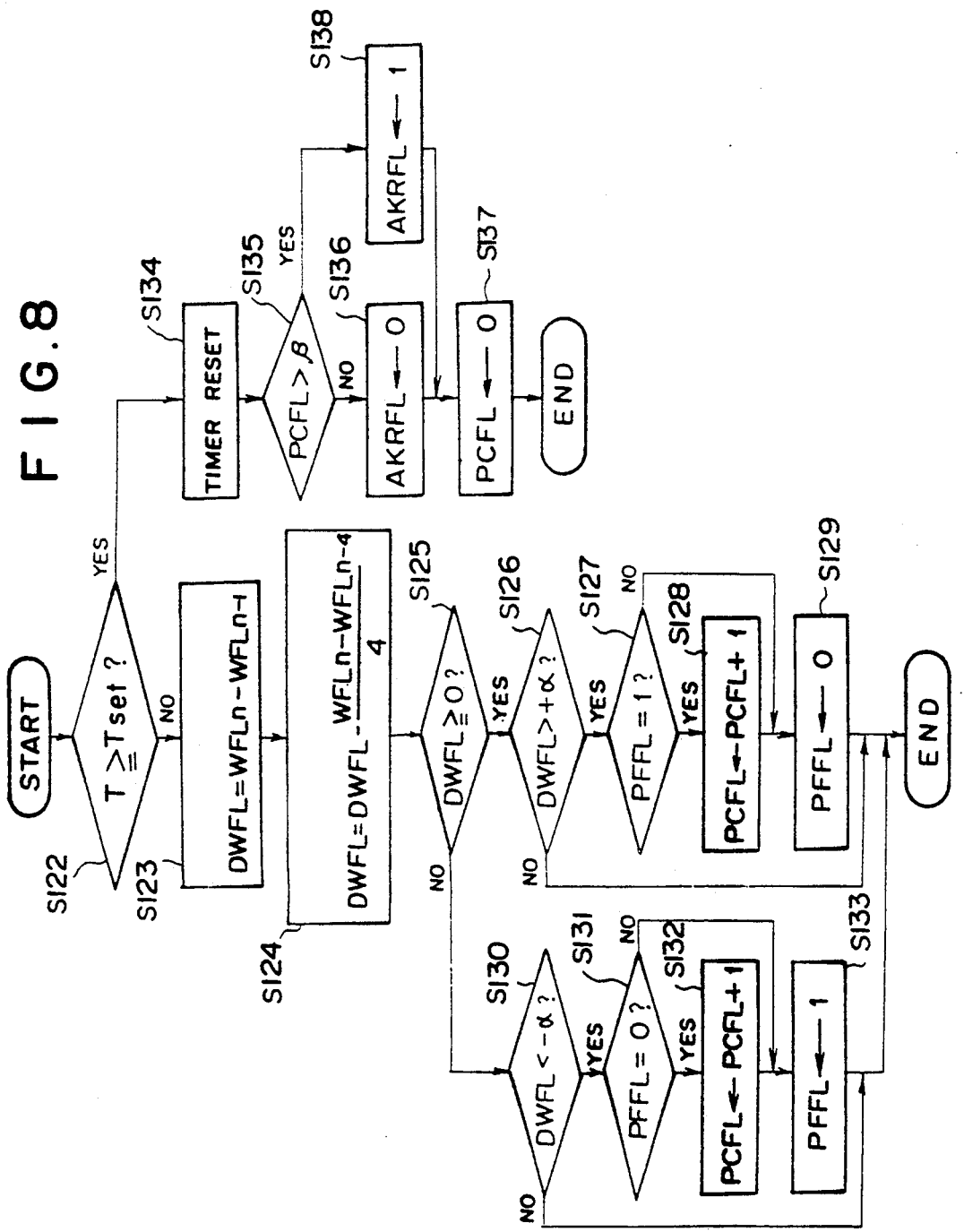

That is, in the second example, the left front rough road flag AKRFL is set to 1 when it is determined that the left front wheel is running a rough road in the manner shown by the flow chart shown in FIG. 8, and to 0 when it is determined that the left front wheel is not running a rough road in the manner shown by the flow chart shown in FIG. 8. The flow chart shown in FIG. 8 is substantially the same as that shown in FIG. 6 except that the threshold value α is not changed according to whether the antiskid control is being effected, and accordingly will not be described here. In the same manner, the left front rough road flag AKRFL, the left rear rough road flag AKRRL and the right rear rough road flag AKRRR are set to 1 when it is determined that the right front wheel, the left rear wheel and the right rear wheel are running a rough road and to 0 when it is determined that the right front wheel, the left rear wheel and the right rear wheel are not running a rough road.

Figure 9:
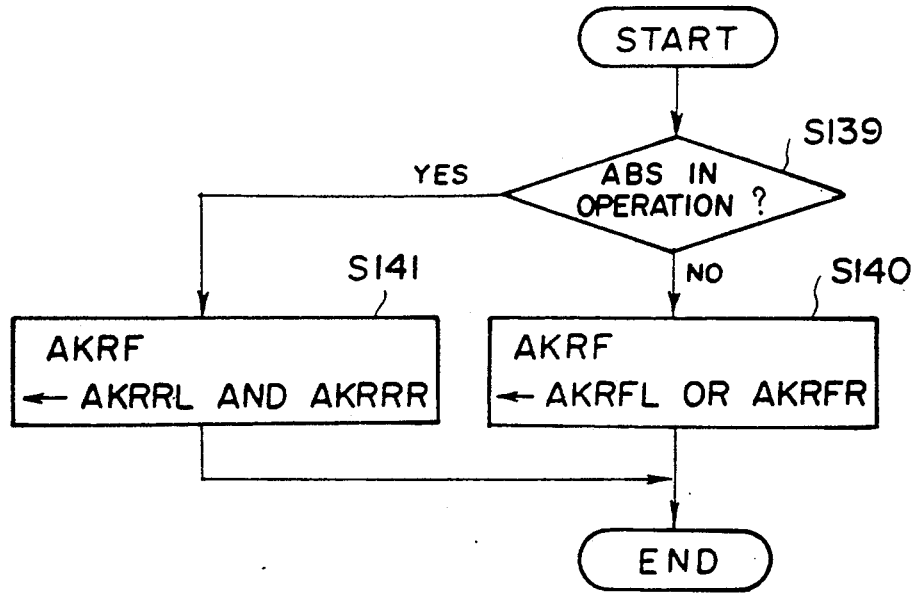
FIG. 8 and 9 are flow charts which show the manner of determining whether the vehicle is running a rough road in the rough road detecting system of the second example which can be employed in the systems according to the present invention.

In the second example, whether the vehicle is running a rough road is determined in the manner shown by the flow chart shown in FIG. 9.

That is, when the antiskid control is not being effected, it is determined that the vehicle is running a rough road when at least one of the left front rough road flag AKRFL and the right front rough road flag AKRFR is 1 and the vehicle rough road flag AKRF is set. (steps S139 and S140) On the other hand, when the antiskid control is being effected, it is determined that the vehicle is running a rough road when the left rear rough road flag AKRRL and the right rear rough road flag AKRRR are both 1 and the vehicle rough road flag AKRF is set. (steps S139 and S141)

Though, in the second example, when the antiskid control is being effected, it is determined that the vehicle is running a rough road only when the left rear rough road flag AKRRL and the right rear rough road flag AKRRR are both 1, it may be determined when at least one of the left rear rough road flag AKRRL and the right rear rough road flag AKRRR is 1.

Further, when the antiskid control is not effected, it may be determined that the vehicle is running a rough road on the basis of either the wheel accelerations of the front wheels or the wheel accelerations of the rear wheels so long as the determination is done on the basis of the wheel accelerations of the rear wheels (the driving wheels) when the antiskid control is being effected.

In the second example, when the antiskid control is being effected, whether the vehicle is running a rough road is determined on the basis of the wheel accelerations of the rear wheels which are applied with braking force smaller than that applied to the front wheels and the accelerations of which are less affected by the fluctuation in the braking force, and whether the vehicle is running a rough road can be precisely determined less affected by change in the oscillation of the wheel accelerations due to the antiskid control.

The third example of the rough road detecting system will be described with reference to FIG. 10, hereinbelow.

In the third example, the wheel accelerations of the left and right front wheels which are the driven wheels of a front-engine rear-drive vehicle provided with a suspension system the spring constant of which can be selected from a larger value and a smaller value are detected, and the frequency at which the acceleration of each wheel oscillates over a predetermined threshold value α in a unit time is compared with a predetermined frequency β. When at least one of the frequencies for the left and right front wheels is larger than the predetermined frequency β, it is determined that the vehicle is running a rough road. The predetermined frequency β is set to be larger when the spring constants of the left and rear wheel suspensions are large.

That is, as shown in FIG. 10, the frequency PCFL at which the true acceleration of the left front wheel DWFL oscillates over the threshold value α is counted in the same manner as in the second embodiment (steps S142 to S153), while the predetermined frequency β is set to β1 when the spring constant of the left and right front suspensions is not large and to β2 when the spring constant is large, β2 being larger than β1 (steps S155 to S157). The spring constant of the left and right front suspensions is detected by a spring constant detecting means which detects the spring constant, for instance, through a signal from a switch for changing the spring constant. Then it is determined in step S158 whether the frequency PCFL is larger than the predetermined frequency β set in step S156 or step S157. When it is determined that the frequency PCFL is not larger than the predetermined frequency β, the left front rough road flag AKRFL is set to 0 in step S159 and the flow is ended after the frequency PCFL is set to 0 in step S161. When it is determined in step S158 that the frequency PCFL is larger than the predetermined frequency β, the left front rough road flag AKRFL is set to 1 and the flow is ended after the frequency PCFL is set to 0 in step S161.

Whether the right front wheel is running a rough road is determined in the same manner, and the right front rough road flag AKRFR is set to 1 when it is determined that the right wheel is running a rough road and to 0 when it is determined that the right front is not running a rough road.

In this example, when it is determined that at least one of the left and front wheels is running a rough road, it is determined that the vehicle is running a rough road in the same manner as the first example.

Though, in the third example, the spring constant of the suspension can be changed in two stages and accordingly, the predetermined frequency $\beta$ is changed in two stages, the predetermined frequency $\beta$ may be changed in more than two stages or continuously when the spring constant can be changed in more than two stages or continuously. Further, the spring constant detecting means may directly detect the spring constant.

In the third example, the predetermined frequency $\beta$ is changed according to the spring constant of the suspension, whether the vehicle is running a rough road can be precisely determined without being affected by change in the oscillation of the wheel accelerations due to change in the spring constant of the suspension.

The fourth example of the rough road detecting system will be described with reference to FIG. 11, hereinbelow.

In the fourth example, the wheel accelerations of the left and rear front wheels which are the driven wheels of a front-engine rear-drive vehicle provided with a suspension system the damping force of which can be selected from a larger value and a smaller value are detected, and the frequency at which the acceleration of each wheel oscillates over a predetermined threshold value $\alpha$ in a unit time is compared with a predetermined frequency $\beta$. When at least one of the frequencies for the left and right front wheels is larger than the predetermined frequency $\beta$, it is determined that the vehicle is running a rough road. The threshold value $\alpha$ is set to be small when the damping force of the left and rear wheel suspensions are large.

In this example, whether the left front wheel is running a rough road is determined in the same manner as that in the first example except that the threshold value $\alpha$ is set to $\alpha 1$ when the damping force of the front suspensions is large and to $\alpha 2$ when the damping force is not large ( step S165 to S167), $\alpha 2$ being larger than $\alpha 1$ as shown in FIG. 11, instead of changing the threshold value $\alpha$ according to whether the antiskid control is being effected.

Whether the right front wheel is running a rough road is determined in the same manner.

In this example, when it is determined that at least one of the left and right wheels is running a rough road, it is determined that the vehicle is running a rough road in the same manner as the first example.

Though, in the fourth example, the damping force can be changed in two stages and accordingly, the threshold value $\alpha$ is changed in two stages, the threshold value $\alpha$ may be changed in more than two stages or continuously when the damping force can be changed in more than two stages or continuously. Further, the damping force detecting means may directly detect the damping force of the suspension.

In the fourth example, since the threshold value $\alpha$ is changed according to the damping force of the suspension, whether the vehicle is running a rough road can be precisely determined without being affected by change in the oscillation of the wheel accelerations due to change in the damping force of the suspension.

A slip control system in accordance with a third embodiment of the present invention will be described with reference to FIGS. 12 to 15, hereinbelow.

The mechanical arrangement of the third embodiment is substantially the same as that of the first embodiment except that the operation of the slip control unit, i.e., the traction control unit UTR in the first embodiment, differs from that in the first embodiment.

In this embodiment, the slip control unit UTR forms a slip control means 100 which effects the traction control and the antiskid control, a left rough road detecting means 200 which detects whether the left wheel is running a rough road, a right rough road detecting means 300 which detects whether the right wheel is running a rough road, a first determining means 400 which determines that the vehicle is running a rough road when at least one of the left and right rough road detecting means detects that the wheel is running a rough road, a second determining means 500 which determines that the vehicle is running a rough road when the left and right rough road detecting means both detect that the wheel is running a rough road, and a rough road correction means 600 which selects one of the first and second determining means according to the running condition of the vehicle or the kind of the slip control to be effected by the slip control means and changes the contents of the slip control effected by the slip control means when the selected determining means determines that the vehicle is running a rough road.

When the slip control means 100 effects the traction control, the rough road correction means 600 selects the first determining means 400 or the second determining means 500 according to the amount of depression of the accelerator pedal as shown in FIG. 13.

In FIG. 13, it is determined whether the amount of depression of the accelerator pedal TH is not smaller than a predetermined value TH1 (e.g., 50%). (step R1) When it is determined that the former is not smaller than the latter, it is determined in step R2 whether the left wheel and/or right wheel is running a rough road. This determination is done by the second determining means 500. When it is determined that the left wheel and/or right wheel is running a rough road, the slip control means 100 sets the first threshold slip ratio SET (first target slip ratio) to a normal value SET1 and effects the traction control based on the value SET1 of the first threshold slip ratio SET. (steps R3 and R4) Otherwise, the rough road correction means 600 effects the rough road correction, i.e., sets the first threshold slip ratio SET to a corrected value SET2 which is larger than the normal value SET1 (step R5) and the slip control means effects the traction control based on the value SET2 of the first threshold slip ratio SET (step R6).

On the other hand, when it is determined in step R1 that the amount of depression of the accelerator pedal TH is smaller than the predetermined value TH1, the first determining means 400 determines in step R7 whether the left and right wheels are both running a rough road. When it is determined that at least one of the left and right wheels is not running a rough road, the slip control means 100 sets the first threshold slip ratio SET (first target slip ratio) to the normal value SET1 and effects the traction control based on the value SET1 of the first threshold slip ratio SET. (steps R8 and R9) Otherwise, the rough road correction means 600 effects the rough road correction, i.e., sets the first threshold slip ratio SET to the corrected value SET2 which is larger than the normal value SET1 (step R10 and slip control means effects the traction control based on the corrected value SET2 of the first threshold slip ratio SET (step R11).

Whether each of the wheels is running a rough road may be determined in the same manner as that described in conjunction with FIG. 8.

In this embodiment, when the amount of depression of the accelerator pedal is small, the rough road correction is effected only when the left and right wheels are both running a rough road, and when the amount of depression of the accelerator pedal is large, the rough road correction is effected even if only one of the left and right wheels is running a rough road.

As described above, the rough road correction during the traction control improves the acceleration performance. That the amount of depression of the accelerator pedal is small means that the driver does not want a high acceleration performance, and accordingly, effecting the rough road correction only when the left and right wheels are both running a rough road as in this embodiment will suffice.

Figure 14:
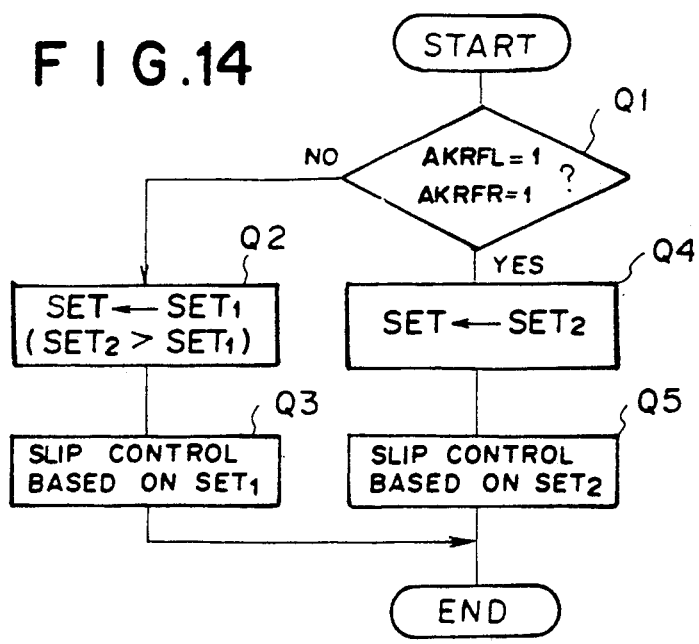
FIG. 14 is a flow chart for illustrating the rough road correction in the antiskid control performed by the slip control unit.

When the slip control means 100 effects the antiskid control, the rough road correction means 600 selects the first determining means 400 as shown in FIG. 14.

That is, it is determined in step Q1 whether it is determined whether the left and right wheels are both running a rough road. When it is determined that both the left and right wheels are not running a rough road, i.e., when the first determining means 400 does not determine that the vehicle is running a rough road, the slip control means 100 sets the first threshold slip ratio SET (first target slip ratio) to the normal value SET1 and effects the antiskid control based on the value SET1 of the first threshold slip ratio SET. (steps Q2 and Q3) Otherwise, the rough road correction means 600 effects the rough road correction, i.e., sets the first threshold slip ratio SET to the corrected value SET2 which is larger than the normal value SET1 (step R10 and slip control means effects the traction control based on the corrected value SET2 of the first threshold slip ratio SET (step R11).

When the rough road correction is effected during the antiskid control, the wheels tend to lock. Accordingly the rough road correction is effected when only one of the left and right wheels is running a rough road, the other wheel which is not running a rough road also tends to lock and the braking efficiency for said the other wheel deteriorates, whereby the braking efficiency of the vehicle deteriorates. Accordingly, during the antiskid control, it is preferred that the rough road correction be not effected when only one of the left and right wheels is running a rough road.

Figure 15:
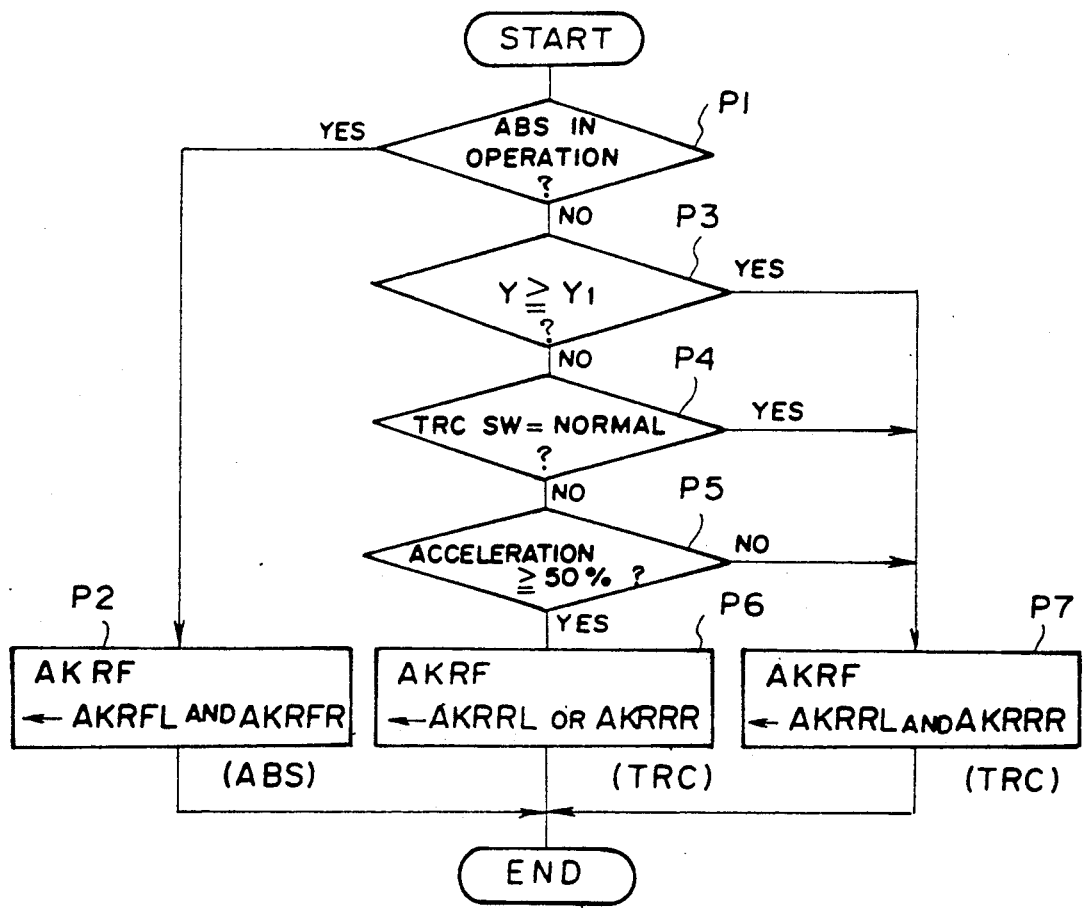
FIG. 15 is a flow chart for illustrating the rough road correction when the slip control unit effects both the traction control and the antiskid control.

When the slip control means 100 effects both the traction control and the antiskid control, the rough road correction means 600 selects the first determining means 400 or the second determining means in the manner shown in FIG. 15.

In FIG. 15, it is determined in step P1 whether the antiskid control is being effected, and when it is determined that the antiskid control is being effected, the rough road correction is effected when both the left and right front wheels are running a rough road. Otherwise, it is determined whether the yaw rate Y is not smaller than a predetermined value Y1 (step P3), whether the normal traction control mode has been selected (step P4) and whether the amount of depression of the accelerator pedal is not smaller than 50% (step P5). When it is determined that the yaw rate Y is smaller than the predetermined value Y1, the normal traction control mode has not been selected (the sport mode has been selected), and at the same time, the amount of depression of the accelerator pedal is smaller than 50%, it is determined that the vehicle is running a rough road when it is determined that at least one of the left and right rear wheels is running a rough road and the rough road correction is effected during the traction control. (step P6)

When it is determined that the yaw rate Y is not smaller than the predetermined value Y1, or it is determined that the normal traction control mode has been selected, or it is determined that the amount of depression of the accelerator pedal is not smaller than 50%, it is determined that the vehicle is running a rough road when it is determined that the left and right rear wheels are both running a rough road and the rough road correction is effected during the traction control. (step P6)

A fourth embodiment of the present invention will be described with reference to FIGS. 16 to 18, hereinbelow.

The mechanical arrangement of the fourth embodiment is substantially the same as that of the first embodiment except that the operation of the slip control unit, i.e., the traction control unit UTR in the first embodiment, differs from that in the first embodiment.

In this embodiment, the slip control unit forms an antiskid control section 120 and a traction control section 121.

Figure 16:
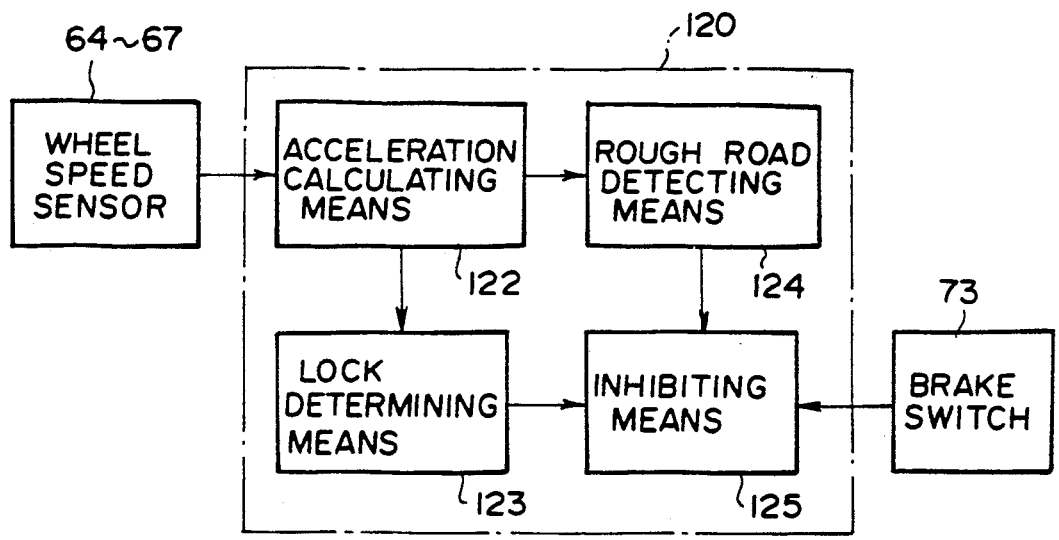
FIGS. 16 and 17 are block diagrams for illustrating the function of the slip control unit in a fourth embodiment of the present invention.

As shown in FIG. 16, the antiskid control section 120 comprises a wheel acceleration detecting means 122 which calculates the acceleration or deceleration of the wheels 1FL, 1FR, 1RL and 1RR on the basis of the rotational speeds of the respective wheels as detected by the wheel speed sensors 64 to 67, a lock determining means 123 which compares the wheel acceleration of each wheel with a predetermined reference value and determines whether the wheel tends to lock, and controls the valves 36A, 36B, 37A and 37B to reduce the brake fluid pressure applied to the wheel which is determined to tend to lock.

The antiskid control section 120 is further provided with a rough road detecting means 124 which detects the vehicle is running a rough road and an inhibiting means which receives the output signal of the rough road detecting means 124 and the output signal of a brake switch 73 (FIG. 1) and inhibits the antiskid control section 120 from beginning the antiskid control when the rough road detecting means 124 detects that the vehicle is running a rough road unless the brake switch 73 indicates that the brake pedal 25 has been pushed down.

Figure 17:
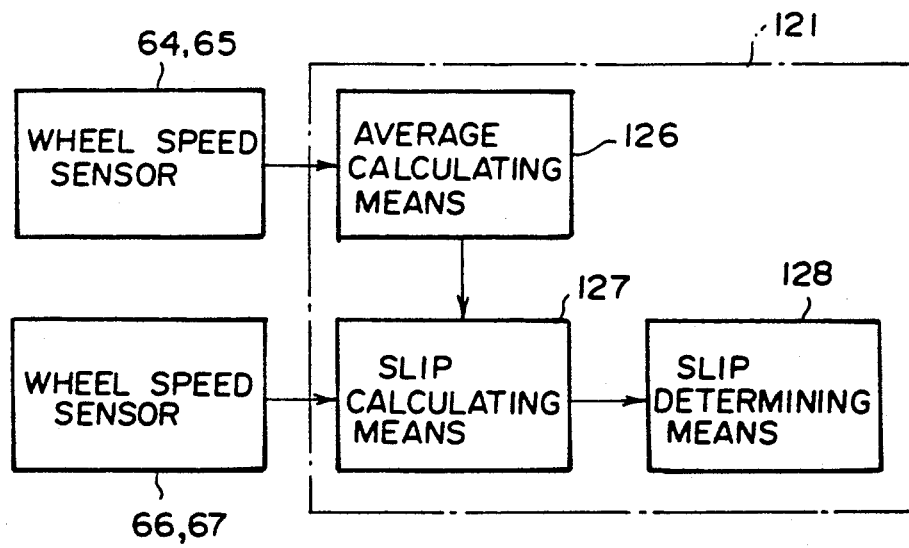

As shown in FIG. 17, the traction control section 121 comprises an average wheel speed calculating means 126 which calculates the average of the rotational speeds of the left and right front wheels 1FL and 1FR, a slip calculating means 127 which calculates the slip of each of the rear wheels (the driving wheels) 1RL and 1RR by subtracting the rotational speed of the rear wheel from the average of the rotational speeds of the front wheels, and a slip determining means 128 which compares the slip of each of the rear wheels with a predetermined reference value and determines that the wheel is slipping when the former is latter than the latter. The traction control section 121 effects the engine output power control and the braking control in the manner described above when the slip determining means 128 determines that the wheel is slipping.

The operation of the antiskid control section 120 will be described with reference to the flow chart shown in FIG. 18, hereinbelow.

In step S221, the deceleration WG of each wheels calculated on the basis of the output signal of the wheel sensor and the deceleration G of the vehicle body detected by a known means (not shown) are read. In step S222, the deceleration of the vehicle body G is subtracted from the deceleration WG of the wheel to obtain the true deceleration of the wheel (WG-G), and it is determined whether the true deceleration of the wheel is larger than a predetermined reference deceleration γ, that is, whether the deceleration of the wheel is large and the wheel tends to lock.

When it is determined that the former is larger than the latter, it is determined in step S223 whether the rough road detecting means 124 has determined that the vehicle is running a rough road. When it is determined that the vehicle is not running a rough road, control signals for effecting the antiskid control are output to the valves 36A, 36B, 37A and 37B in step S225.

On the other hand, when it is determined in step S223, it is determined in step S224 whether the brake switch 73 is ON, i.e., the brake pedal has been pushed down. When it is determined that the brake switch 73 is ON, the control signals for effecting the antiskid control are output to the valves 36A, 36B, 37A and 37B in step S225. However when it is determined in step S224 that the brake switch 73 is not ON, the control signals are not output.

As can be understood from the description above, in the system of this embodiment, the antiskid control section 120 is provided with an inhibiting means 125 which inhibits the antiskid control section 120 from beginning the antiskid control when the vehicle is running a rough road unless the brake pedal is pushed down even if the deceleration of the wheel indicates that the wheel tends to lock.

When the vehicle is running a rough road, the wheel acceleration fluctuates due to unevenness on the road surface, and the deceleration of the wheel during the fluctuation can mislead the antiskid control section into detecting that the wheel tends to lock though the brake is not applied. Especially, when a vehicle is provided with both the antiskid control system and the traction control system and when the traction control system applies the brake to the driving wheel during running a rough road, the driving wheel is abruptly decelerated, and the antiskid control system can misjudge that the driving wheel is about to lock, whereby the traction control is interrupted and the antiskid control is began. In the fourth embodiment, the inhibiting means 125 prevents such malfunction of the antiskid control system.

We claim:

1. A slip control system for a vehicle comprising a slip ratio detecting means which detects a slip ratio of driving wheels of the vehicle, a driving wheel slip control means which controls slip of the driving wheels with a predetermined controlled variable so that the slip ratio of the driving wheels converges on a predetermined target slip ratio when the slip ratio of the driving wheels as detected by the slip ratio detecting means exceeds a predetermined threshold slip ratio, a rough road detecting means which determines whether the vehicle is running a rough road, a rough road correction means which causes the control of the slip control system to be less effective on the driving wheels at a given slip ration when the rough road detecting means determines that the vehicle is running a rough road, a running condition detecting means which detects running condition of the vehicle, and a rough road correction control means which controls the rough road correction means on the basis of the running condition as detected by the running condition detection means wherein said running condition detecting means comprises a steering angle detecting means, a means for detecting the amount of depression of an accelerator pedal, a means for detecting the running mode and a vehicle speed detecting means and said rough road correction control means permits the rough road correction means to cause the control of the slip control system to be less effective on the driving wheels at a given slip ratio when the steering angle is not larger than a predetermined value, the vehicle speed is not larger than a predetermined value, the amount of depression of the accelerator pedal is larger than a predetermined value and a running mode in which the acceleration performance is an important factor is selected.

2. A slip control system as defined in claim 1 in which said rough road detecting system comprises a wheel speed change detecting means which detects the changes in the speed of front and rear wheels of the vehicle, a braking detecting means which detects application of brake to the wheel, and a determining means which determines whether the vehicle is running a rough road on the basis of the change in the speed of at least one of the front and rear wheels characterized in that said determining means determines whether the vehicle is running a rough road on the basis of the change in the speed of the rear wheel at least when the brakes are applied to the front and rear wheels.

3. A rough road detecting system for detecting whether a vehicle is running a rough road comprising a wheel speed change detecting means which detects the changes in the speed of front and rear wheels of the vehicle, a braking detecting means which detects application of brake to the wheel, and a determining means which determines whether the vehicle is running a rough road on the basis of the change in the speed of at least one of the front and rear wheels characterized in that said determining means determines whether the vehicle is running a rough road on the basis of the change in the speed of the rear wheel at least when the brakes are applied to the front and rear wheels, wherein said determining means determines whether the vehicle is running on a rough road based on the change in speed of at least one rear wheel when the brakes are applied; and wherein said determining means determines whether the vehicle is running on a rough road based upon one of the change in the speed of at least one front wheel; end: the change in the speeds of at least one front wheel and at least one rear wheel when the brakes are not applied.

4. A slip control system as defined in claim 3 in which said rough road correction means increases said predetermined threshold slip ratio when the rough road detecting means determines that the vehicle is running a rough road.

5. A slip control system as defined in claim 3 in which said rough road correction means increases said target slip ratio when the rough road detecting means determines that the vehicle is running a rough road.

6. A slip control system as defined in claim 3 in which said running condition detecting means comprises a steering angle detecting means and said rough road correction control means inhibits the rough road correction means from causing the control of the slip control system to be less effective on the driving wheels at a given slip ratio when the steering angle is larger than a predetermined value.

7. A slip control system as defined in claim 3 in which said running condition detecting means comprises a steering angle detecting means and a vehicle speed detecting means and said rough road correction control means inhibits the rough road correction means from causing the control of the slip control system to be less effective on the driving wheels at a given slip ratio when the steering angle is not larger than a predetermined value and the vehicle speed is larger than a predetermined value.

8. A slip control system as defined in claim 3 in which said running condition detecting means comprises a steering angle detecting means, a means for detecting the amount of depression of an accelerator pedal and a vehicle speed detecting means and said rough road correction control means inhibits the rough road correction means from causing the control of the slip control system to be less effective on the driving wheels at a given slip ratio when the steering angle is not larger than a predetermined value, the vehicle speed is not larger than a predetermined value and the amount of depression of the accelerator pedal is not larger than a predetermined value.

9. A slip control system as defined in claim 3 in which said running condition detecting means comprises a steering angle detecting means, a means for detecting the amount of depression of an accelerator pedal, a means for detecting the running mode and a vehicle speed detecting means and said rough road correction control means inhibits the rough road correction means from causing the control of the slip control system to be less effective on the driving wheels at a given slip ratio when the steering angle is not larger than a predetermined value, the vehicle speed is not larger than a predetermined value, the amount of depression of the accelerator pedal is larger than a predetermined value and a running mode in which the acceleration performance is not an important factor is selected.

10. A slip control system as defined in claim 3 in which said rough road detecting system comprises a wheel acceleration detecting means which detects the acceleration of the wheel, a comparing means which compares the frequency at which the acceleration of the wheel oscillates over a predetermined threshold value in a unit time with a predetermined frequency and determines that the wheel is running a rough road when the former is larger than the latter, a braking detecting means which detects application of brake to the wheel, and a threshold value changing means which changes the threshold value according to whether the brake is applied to the wheel so that the threshold value is larger when the brake is applied to the wheel than when the brake is not applied to the wheel.

11. A slip control system as defined in claim 3 in which said rough road detecting system comprises a wheel acceleration detecting means which detects the acceleration of the wheel, a comparing means which compares the frequency at which the acceleration of the wheel oscillates over a predetermined threshold value in a unit time with a predetermined threshold frequency and determines that the wheel is running a rough road when the former is larger than the latter, a spring constant detecting means which detects the spring constant of a suspension of the wheel, and a threshold frequency changing means which increases the threshold frequency with increase of the spring constant.

12. A slip control system as defined in claim 3 in which said rough road detecting system comprises a wheel acceleration detecting means which detects the acceleration of the wheel, a comparing means which compares the frequency at which the acceleration of the wheel oscillates over a predetermined threshold value in a unit time with a predetermined threshold frequency and determines that the wheel is running a rough road when the former is larger than the latter, a damping force detecting means which detects the damping force of a suspension of the wheel, and a threshold value changing means which reduces the threshold value with increase of the damping force.

13. A rough road detecting system of claim 3, wherein said determining means determines whether the vehicle is running on a rough road based upon the change and speed of at least one front wheel when the brakes are not applied.

14. A rough road detecting system for detecting whether a wheel of a vehicle is running a rough road comprising a wheel acceleration detecting means which detects the acceleration of the wheel, a comparing means which compares the frequency at which the acceleration of the wheel oscillates over a predetermined threshold value in a unit time with a predetermined frequency and determines that the wheel is running a rough road when the former is larger than the latter, a braking detecting means which detects application of brake to the wheel, and a threshold value changing means which changes the threshold value according to whether the brake is applied to the wheel so that the threshold value is larger when the brake is applied to the wheel than when the brake is not applied to the wheel.

15. A rough road detecting system for detecting whether a vehicle is running a rough road comprising a wheel speed change detecting means which detects the changes in the speed of front and rear wheels of the vehicle, a braking detecting means which detects application of brake to the wheel, and a determining means which determines whether the vehicle is running a rough road on the basis of the change in the speed of at least one of the front and rear wheels characterized in that said determining means determines whether the vehicle is running a rough road on the basis of the change in the speed of the rear wheel at least when the brakes are applied to the front and rear wheels.

16. A rough road detecting system for detecting whether a wheel of a vehicle is running a rough road comprising a wheel acceleration detecting means which detects the acceleration of the wheel, a comparing means which compares the frequency at which the acceleration of the wheel oscillates over a predetermined threshold value in a unit time with a predetermined threshold frequency and determines that the wheel is running a rough road when the former is larger than the latter, a spring constant detecting means which detects the spring constant of a suspension of the wheel, and a threshold frequency changing means which increases the threshold frequency with increase of the spring constant.

17. A rough road detecting system for detecting whether a wheel of a vehicle is running a rough road comprising a wheel acceleration detecting means which detects the acceleration of the wheel, a comparing means which compares the frequency at which the acceleration of the wheel oscillates over a predetermined threshold value in a unit time with a predetermined threshold frequency and determines that the wheel is running a rough road when the former is larger than the latter, a damping force detecting means which detects the damping force of a suspension of the wheel, and a threshold value changing means which reduces the threshold value with increase of the damping force.

18. A slip control system for a vehicle comprising a slip control means which controls slip of front and rear wheels of the vehicle, a left rough road detecting means which detects whether the left wheel is running a rough road on the basis of change in the speed of the left wheel, a right rough road detecting means which detects whether the right wheel is running a rough road on the basis of change in the speed of the right wheel, a first determining means which determines that the vehicle is running a rough road when at least one of the left and right rough road detecting means detects that the wheel is running a rough road, a second determining means which determines that the vehicle is running a rough road when the left and right rough road detecting means both detect that the wheel is running a rough road, and a rough road correction means which selects one of the first and second determining means according to the running condition of the vehicle or the kind of the slip control to be effected by the slip control means and changes the contents of the slip control effected by the slip control means when the selected determining means determines that the vehicle is running a rough road.

19. A slip control system as defined in claim 18 in which said rough road correction means selects the first determining means when the slip control to be effected by the slip control means is an antiskid control.

20. A slip control system as defined in claim 18 in which said rough road correction means selects the first determining means when the slip control to be effected by the slip control means is a traction control and the amount of depression of the accelerator pedal is not larger than a predetermined value.

21. A slip control system as defined in claim 18 in which said rough road correction means selects the second determining means when the slip control to be effected by the slip control means is a traction control and the amount of depression of the accelerator pedal is larger than a predetermined value.

22. An antiskid control system for a vehicle which controls braking force applied to a wheel of the vehicle so that the wheel does not lock when the deceleration of the wheel as detected by a wheel deceleration detecting means exceeds a predetermined reference value characterized by having a braking detecting means which detects that a brake pedal of the vehicle has been operated, a rough road detecting means which detects that the vehicle is running a rough road, and an inhibiting means which inhibits the antiskid control system from beginning the antiskid control when the rough road detecting means detects that the vehicle is running a rough road unless the braking detecting means detects that the brake pedal of the vehicle has been operated.

* * * * *